United States Patent [19]

Spée et al.

[11] Patent Number: 5,798,631

[45] Date of Patent: Aug. 25, 1998

[54] PERFORMANCE OPTIMIZATION CONTROLLER AND CONTROL METHOD FOR DOUBLY-FED MACHINES

[75] Inventors: René Spée; Shibashis Bhowmik, both of Corvallis, Oreg.; Johan H. R. Enslin, Stellenbosch, South Africa

[73] Assignee: The State of Oregon Acting by and Through the State Board of Higher Education on Behalf of Oregon State University, Eugene, Oreg.

[21] Appl. No.: 725,187

[22] Filed: Oct. 2, 1996

Related U.S. Application Data

[60] Provisional application No. 60/004,790, Oct. 2, 1995.
[51] Int. Cl.$^6$ ........................................................ H02P 9/44
[52] U.S. Cl. ........................... 322/25; 322/29; 322/32; 318/767; 290/31
[58] Field of Search ............................... 322/25; 318/767; 290/52

[56] References Cited

U.S. PATENT DOCUMENTS

| | | | |
|---|---|---|---|
| 4,982,147 | 1/1991 | Lauw | 318/729 |
| 4,994,684 | 2/1991 | Lauw et al. | 290/52 |
| 5,028,804 | 7/1991 | Lauw | 290/40 C |
| 5,082,077 | 1/1992 | Wallace et al. | 322/32 |
| 5,239,251 | 8/1993 | Lauw | 318/767 |

OTHER PUBLICATIONS

L. Dessaint et al.; *Propagation and Elimination of Torque Ripple in a Wind Energy Conversion System*, IEEE Transactions on Energy Conversion, vol. EC-1, No. 2, pp. 104–112 (Jun., 1986).

Nakra et al.; *Slip Power Recovery Induction Generators for Large Vertical Axis Wind Turbines*; IEEE Transactions on Energy Conversion, vol. 3, No. 4, pp. 733–737 (Dec., 1988).

Enslin et al.; *Adaptive, Closed–Loop Control of Dynamic Power Filters as Fictitious Power Compensators*; IEEE Transactions on Industrial Electronics, vol. 37, No. 3, pp. 203–211 (Jun., 1990).

Li et al.; *Two–Axis Model Development of Cage–Rotor Brushless Doubly–Fed Machines*; IEEE Transactins on Energy Conversion; vol. 6, No. 3, pp. 453–460 (Sep., 1991).

Xu et al.; *A Novel Wind–Power Generating System Using Field Orientation Controlled Doubly–Excited Brushless Reluctance Machine*; IEEE, pp. 408–413 (Jan., 1992).

Li et al.; *Synchronous Drive Performance of Brushless Doubly–Fed Motors*; IEEE, pp. 631–638 (Jan., 1992).

C. Brune et al.; *Experimental Evaluation of a Variable–Speed, Doubly–Fed Wind–Power Generation System*; IEEE pp. 480–487 (1993).

*Primary Examiner*—Steven L. Stephan
*Assistant Examiner*—Nicholas Ponomarenko
*Attorney, Agent, or Firm*—Klarquist Sparkman Campbell Leigh and Whinston LLP

[57] ABSTRACT

A variable speed, constant frequency (VSCF) system utilizes a doubly-fed machine (DFM) to maximize the output power of the system. The system includes a power converter that provides a frequency signal and a current signal to the DFM. The power converter is controlled by an adaptive controller. The controller signals the converter to vary its frequency signal and thereby the rotor speed of the DFM until a maximum power output is sensed. The controller also signals the converter to vary its current signal and thereby the portions of power carried by the respective windings until a maximum power output is sensed. The control can be augmented to not only maximize power and efficiency, but also provide for harmonic and reactive power compensation.

17 Claims, 13 Drawing Sheets

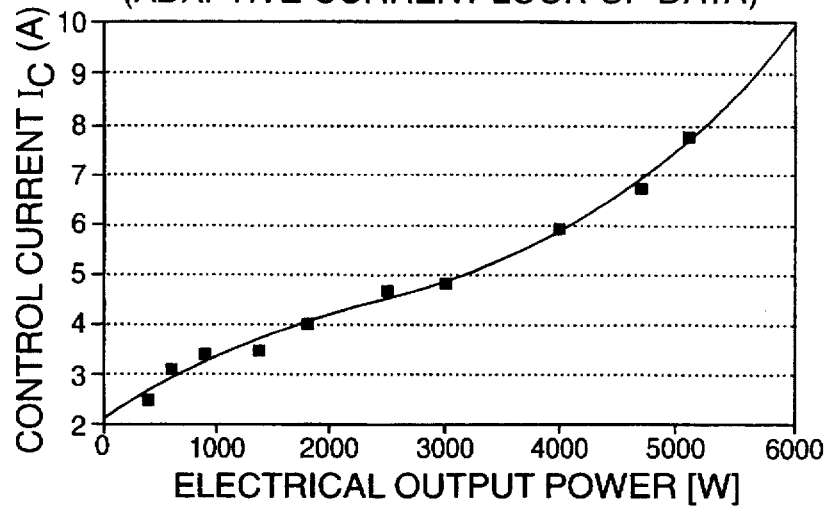
FIG. 12 BDFM MAXIMUM EFFICIENCY (ADAPTIVE CURRENT LOOK-UP DATA)
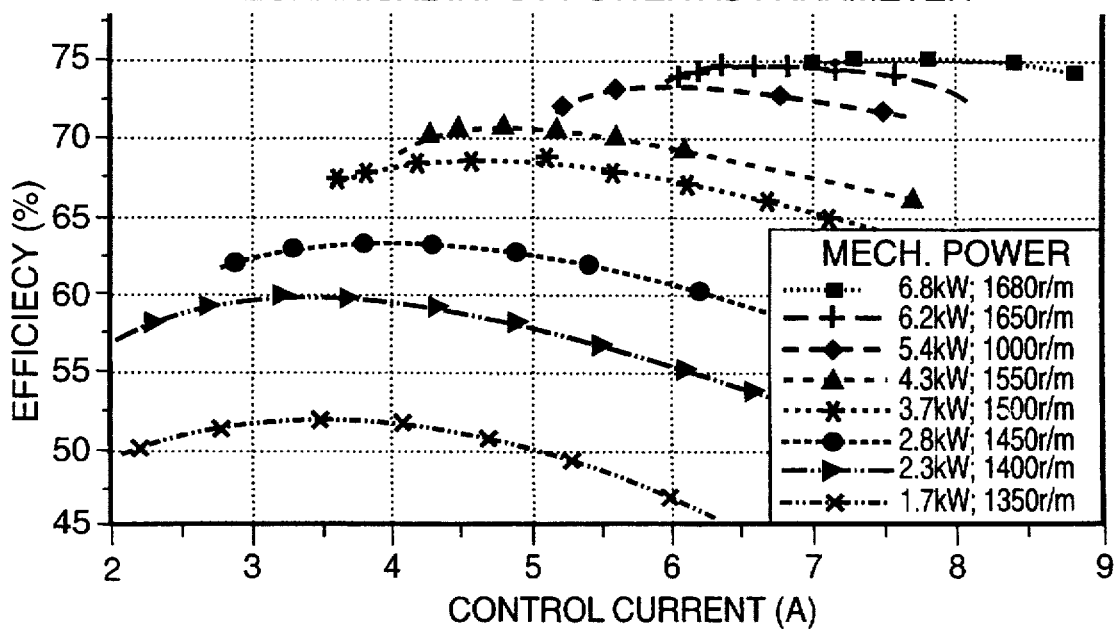
FIG. 14 EFFICIENCY OF BDFM MECHANICAL INPUT POWER AS PARAMETER

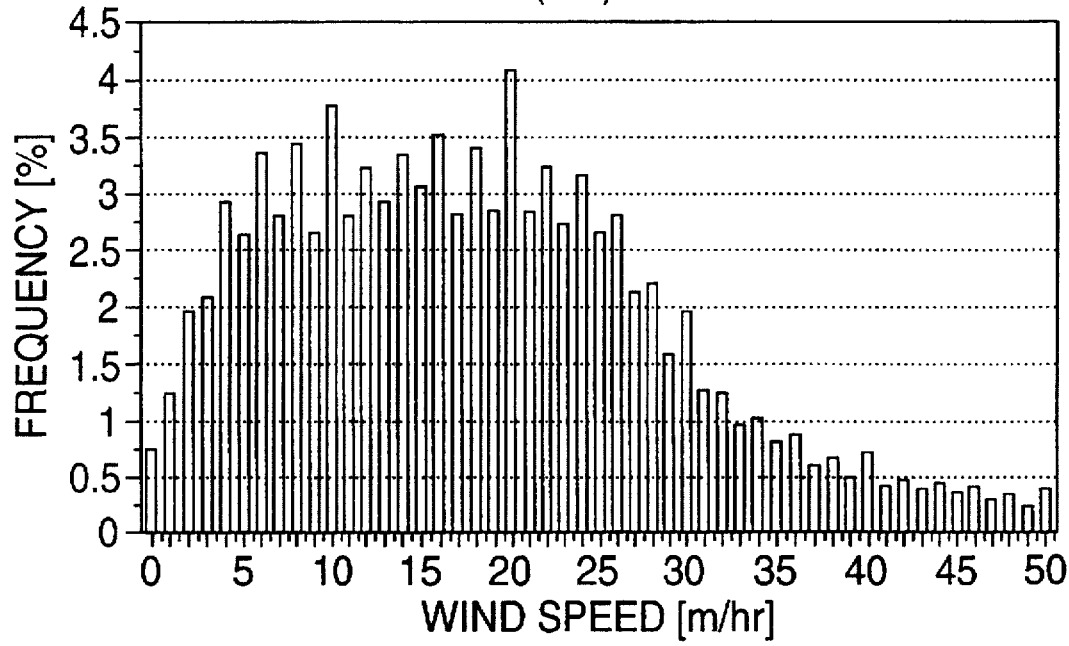
FIG. 17 CAPE BLANCO (OR) WIND DATA
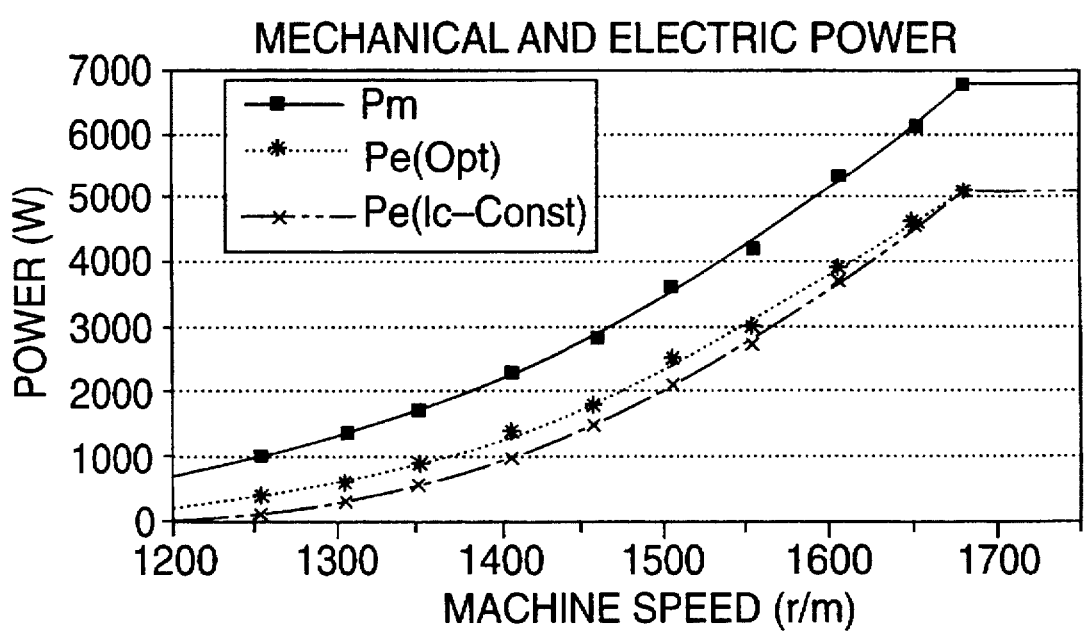
FIG. 18 POWER FROM BDFM MECHANICAL AND ELECTRIC POWER 5,798,631

PERFORMANCE OPTIMIZATION CONTROLLER AND CONTROL METHOD FOR DOUBLY-FED MACHINES

RELATED APPLICATION DATA

This application is based on U.S. Provisional Application Serial No. 60/004,790, filed Oct. 2, 1995.

FIELD OF THE INVENTION

This invention relates to energy conversion systems for generating or consuming electricity and for methods for controlling such systems. More particularly, this invention relates to a control system for optimizing the performance of a doubly-fed variable speed generation (VSG) system such as a wind or hydro turbine-based system or a doubly-fed adjustable speed drive (ASD) system.

BACKGROUND OF THE INVENTION

A VSG system converts energy from a variable resource such as wind or water flow into variable rotational mechanical energy of a turbine or other device. The mechanical energy is then converted into electrical energy by an electrical generator. VSG systems that utilize a doubly-fed electrical generator are shown and described in U.S. Pat. Nos. 4,994,684 and 5,028,804, which are hereby incorporated by reference.

Renewed interest has been shown in environmentally conscious renewable energy resources such as wind and hydro power generation schemes with the advent of power electronic drives for VSG systems. Presently available and proposed generators include systems based mainly on dc machine, synchronous and induction machine technology as well as reluctance machines. While extracting more energy from the wind, for example, most proposed variable-speed systems suffer a cost disadvantage due to the required rating of the power electronic converter. This cost penalty may eventually render the additional energy capture meaningless. Thus, reducing the cost of the power electronic hardware is essential for variable-speed generating systems to achieve viable and competitive $/kWh ratios when compared to fossil fuel-based generating systems.

Due to the power electronic utility interface provided with a typical variable speed generation systems, it is also possible to improve the poor displacement power factor associated with induction generators. At the same time, harmonics from other generators or non-linear loads can be minimized or compensated using appropriate converter control algorithms and passive harmonic filters. While offering significant benefits in operational performance, variable-speed generators have the drawbacks of higher initial cost as well as increased complexity resulting in potentially lower reliability. In a well designed and engineered system, however, the additional costs should be offset by increased energy capture and improved control flexibility.

An objective of this invention therefore is to provide a VSG system of simpler design and low initial cost that can be inexpensively maintained on site. Another objective of the invention is to provide a VSG system that maximizes the real or active power generated by the system at any given variable resource energy level.

SUMMARY OF THE INVENTION

The proposed variable speed, constant frequency (VSCF) system utilizes a doubly-fed machine (DFM) to maximize the output power of the system. The system includes a power converter that provides a current excitation signal to the control winding of the DFM. The output of the power converter is controlled by an adaptive controller. The controller signals the converter to vary the frequency of its output current excitation signal and thereby the rotor speed of the DFM until a maximum power output is sensed (maximum power point of turbine converting resource energy into mechanical energy). The controller also signals the converter to vary the magnitude of the output current excitation signal and thereby the portions of power carried by the respective windings of the DFM until a maximum power output is again sensed (maximum power point of generator system converting mechanical into electrical energy). The control can be augmented to not only maximize power and efficiency, but also provide for harmonic and reactive power compensation.

The foregoing and other objects, features, and advantages of the invention will become more apparent from the following detailed description of a preferred embodiment which proceeds with reference to the accompanying drawings.

BRIEF DESCRIPTION OF THE DRAWINGS

FIG. 12 is a graph of neural network optimum efficiency training data.

FIG. 14 is a graph of measured efficiencies of prototype BDFM generator.

FIG. 17 is a graph of annual wind speed distribution.

FIG. 18 is a graph of measured power enhancement for a BDFM generator according to the invention.

DETAILED DESCRIPTION OF A PREFERRED EMBODIMENT

The invention has applicability in any environment where the energy resource being tapped is varying, such as wind or water. The following description, therefore, is only of a preferred embodiment of the invention where wind is the resource. Those of skill in the art will appreciate that the invention is not limited to wind-powered systems but may be used wherever its concepts are applicable.

Figure 1:
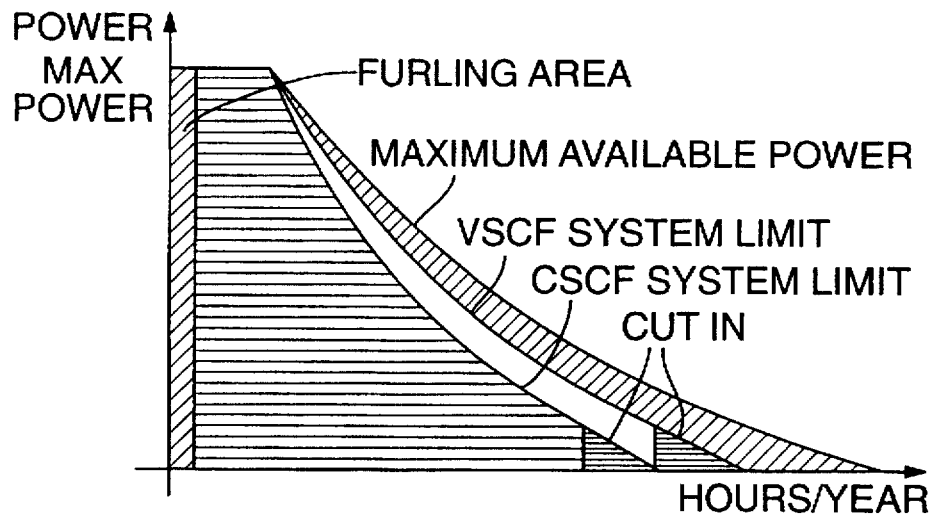
FIG. 1 is a graph of power available with VSCF/CSCF systems.

The conversion of wind energy into electricity on a large scale raises the problem of energy storage. Although work is in progress on various other storage systems, the electrical supply grid is a convenient absorber of electricity generated from wind on a large scale, provided the capacity of the wind generation equipment is still small in relation to the total generating capacity coupled to the supply grid. Coupling the wind generating equipment to the supply grid immediately raises the problem of converting the power at varying wind speeds found in practice to the constant frequency of the grid. For constant speed constant frequency (CSCF) systems the energy capture capability per year is much smaller than for variable speed constant frequency (VSCF) systems, which are a particular type of VSG system. This is illustrated in FIG. 1. The invention, as will be described, is an improved VSCF system.

A wind turbine can only extract a certain percentage of the power associated with the wind, up to the maximum Betz limit of 59%. This fraction is described as the power coefficient. The value of the power coefficient is a function of the form, wind speed, rotation speed and pitch of the specific wind turbine. Assuming all other operational variables to be constant, this coefficient has only one maximum point at a fixed wind speed as the rotational speed is varied. It is therefore important to adapt the rotational speed of the turbine to correspond to the wind speed in order to extract the maximum power possible out of the wind. The characteristics of the power coefficient are normally expressed in terms of the tip-speed-ratio A, which is defined as:

$$\lambda = \frac{v_p}{v} = \frac{\Omega_T \cdot R}{v} \quad (1)$$

with:

$v_p$—tip-speed of turbine blade

R—turbine rotor radius, $\Omega_T$—rotational turbine angular velocity;

v—wind speed.

Figure 2:
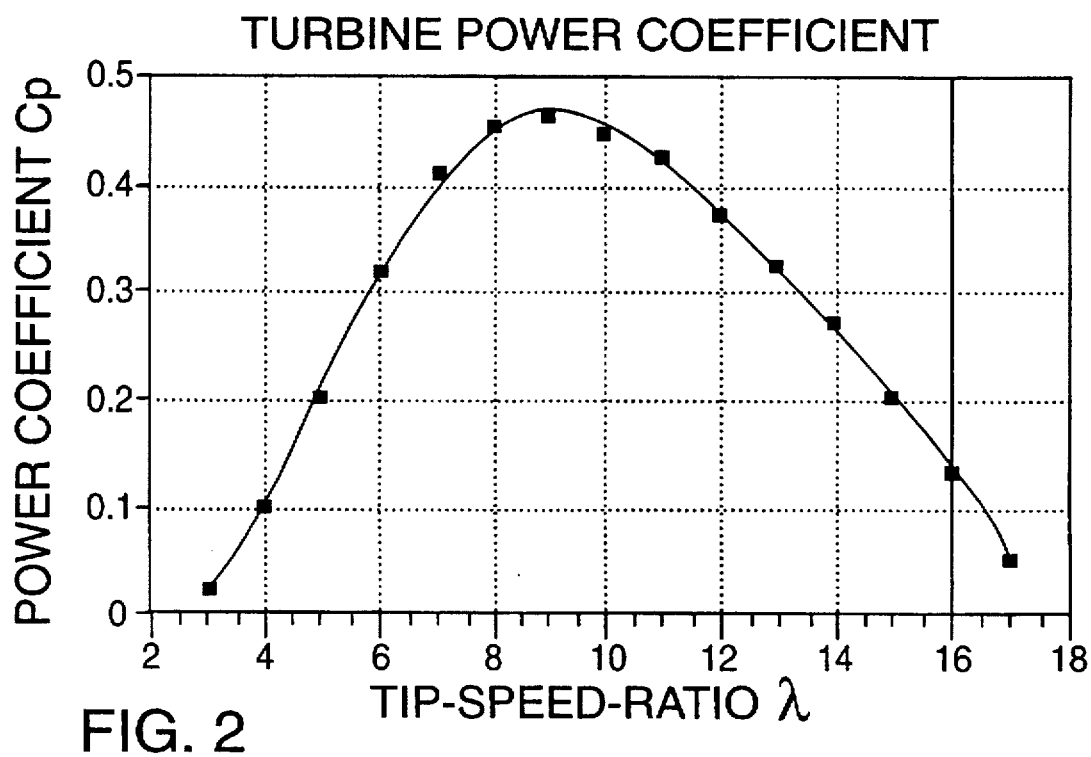
FIG. 2 is a graph of the power coefficient of a 100 kW wind turbine.

In FIG. 2 the power coefficient $C_p$ is plotted as a function of the tip-speed ratio $\lambda$ for a 100 kW high speed turbine. $C_p$ depends on the particulars of blade design and is a function of the tip-speed ratio. The torque coefficient $C_T$ of the turbine is described in the following equation:

$$C_T = \frac{\text{Torque}}{1/2 \rho v^2 AR} = \frac{1}{\lambda} \cdot C_p \quad (2)$$

with:

$\rho$—air density;

A—sweep area

Figure 3:
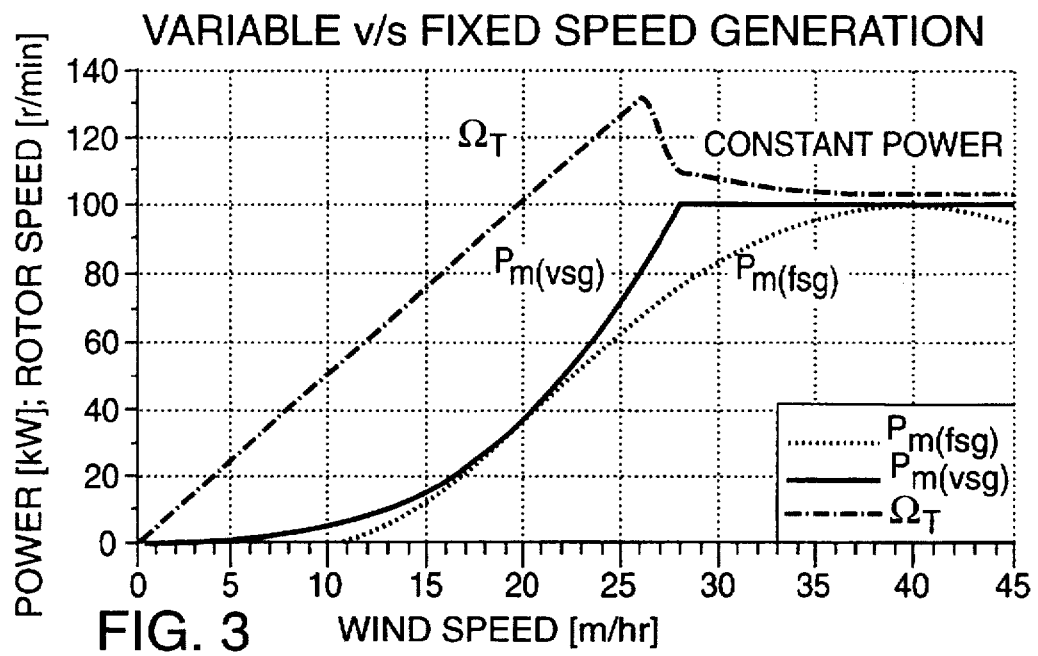
FIG. 3 is a graph of power and speed characteristics of a 100 kW turbine.

The power and torque of a wind turbine can be described by the combination of the power, torque and wind speed characteristics shown in FIG. 2. Wind turbines are thus most efficient at one tip-speed ratio ($\lambda$). As illustrated in FIG. 3, power output is related to the cube of the upstream wind velocity v, or $$P_w = \frac{1}{2} \pi \rho C_p R^2 v^3 \quad (3)$$

where p is the specific mass of air and $C_p$ is the coefficient of power.

With a fixed-speed wind turbine system, it may be necessary to use pitch control of the blades to optimize performance, thus introducing additional mechanical control systems, complexities and costs. With variable-speed generation, however, it is possible to track the changes in wind speed by changing shaft speed and thus maintaining optimal energy generation.

In FIG. 3 the rotor power from the wind turbine is plotted using variable speed operation (VSG) and fixed speed operation (FSG). The fixed speed system is optimized at only a single speed, generally representing maximum energy capture potential for a given site, and power output at near cut-in and maximum power are significantly lower than for the variable speed system. The fixed speed system is inherently power limited as increasing wind speeds lower the turbine power coefficient. The variable speed system, on the other hand, will attempt to track maximum power at any wind speed. During variable speed operation wind and rotor speed are related linearly, whereas in the constant power regime, shaft speed drops off sharply and is kept essentially constant thereafter. The data in FIG. 3 also gives the basis for required speed range and gearbox ratio, which relates turbine rotor speed to generator shaft speed.

Horizontal axis wind turbines produce a non-constant torque due to tower shadow. As each blade passes the supporting tower, the output torque decreases. Thus, the torque produced by a two-blade wind turbine contains a harmonic at twice the rotational speed. Typically, a fixed-speed system is unable to mitigate this effect in order to improve the quality of the output power. In VSG systems, however, appropriate control of the power electronic converter can minimize torque ripple and thus output power pulsations. The torque ripple control can utilize either the energy storage in the link of the converter or it can utilize the inertia of the generator as energy storage via appropriate (field oriented) control. See, for example, U.S. Pat. No. 5,083,039 or D. Zhou, "Dynamic Control of Brushless Doubly-Fed Machines," Ph.D. Dissertation, Oregon State University, 1995.

Some large wind systems are not self-starting or self-stopping. Tower resonances require that the wind turbine be motored up to the operating speed. Fixed-speed systems require the starting of a large induction machine with the resulting expense of soft start mechanisms; also, stopping a fixed-speed system usually requires a large mechanical braking system.

In CSCF systems the electromechanical energy conversion is done by means of a synchronous generator so that variations in wind speed have to be accommodated by pitch control of the wind turbine itself. This means that the primary power flow control function is referred to the mechanical side of the system. In VSCF systems, such as in the invention, the wind turbine operates at variable speed. If this variable speed region is made large enough, it is possible to operate a fixed pitch wind turbine and refer the entire power control function to electrical devices.

Only limited variable speed operation is possible with a conventional induction generator, since the efficiency becomes proportional to speed. This has led to the investigation of over synchronous operation of slip ring or wound rotor doubly-fed induction generators with rotor and stator power fed back to the supply. In this case, variable speed operation is possible while only controlling the electrical side of the system. These systems are suitable for application to conventional horizontal-axis wind turbines as well as to vertical axis machines.

Singly-fed cage rotor IM systems inherently use large and expensive converters, typically at 125% of machine rating. Doubly-fed wound-rotor induction generators use much smaller and thus cheaper converters to process slip power, but are more prone to failures due to the use of slip rings. Recently, doubly-fed machines without slip-rings have been proposed as viable variable speed generators for wind power applications. FIGS. 4(a)–(d) show variable speed systems based on ac machines and voltage source inverter technology. These represent the desired implementation for medium power (approx. 100–500 kW) wind systems. Higher power turbines may still utilize current-fed, supply commutated topologies. The system selection process should be based on the following criteria:

(i) Reliability and maintenance;

(ii) Minimum number of components and cost;

(iii) Efficiency and applicability over power range;

(iv) Supply interaction and contamination.

Figure 4A:
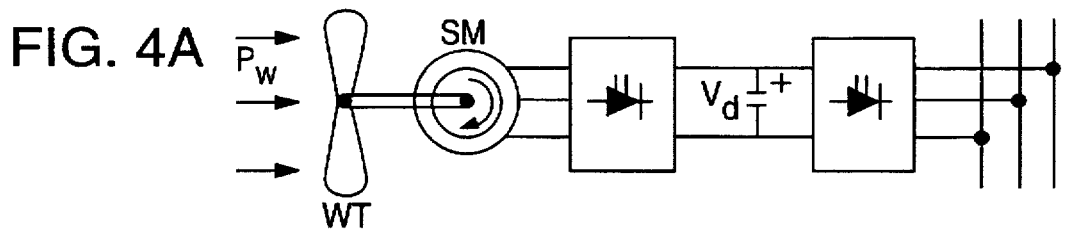
FIGS. 4(a)–(d) are block diagrams of four possible energy conversion systems for VSG: (a) synchronous (b) wound rotor induction (c) cage rotor induction and (d) brushless doubly-fed.

The systems suggested in FIGS. 4(a) and (c) will have approximately the same supply interaction, since all rely on processing the entire power generated in the inverter systems provided with attendant power quality problems. Similarly, the topologies shown in FIGS. 4(b) and (d) generate most power directly into the grid without power electronic interface and thus have potentially more attractive harmonic characteristics. Very important differences between the systems lie in the application of selection criteria (i) and (iii) above. Maintenance and reliability considerations, especially for equipment that should be capable of working unattended for extended periods, suggest that slip rings should be avoided.

Figure 4B:
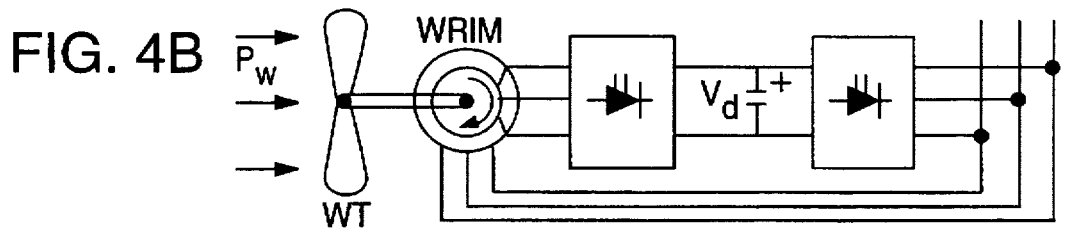

Regarding selection criterion (ii) stated above, there is an important fundamental difference between the systems illustrated. In the doubly-fed systems shown, the power electronics do not handle all the system power, but only the part that is used for system control and not directly fed into the supply. Power flow characteristics of the electronic Scherbius system of FIG. 4(b) are well known. The maximum power operation (FIG. 3) corresponds to rated torque at twice synchronous speed, which is the speed of operation with a dc excitation on the control winding, and the power electronic sub-system will be rated at 50% of that necessary for the synchronous generator system in the same application. Thus, doubly-fed systems can be installed at an appreciable saving in capital investment.

Figure 4C:
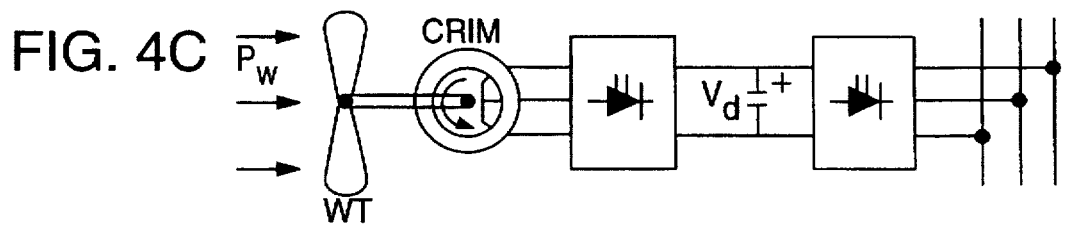

The generator system shown in FIG. 4(c), uses a standard cage rotor induction machine (CRIM), of lower cost than the doubly-fed Scherbius cascade. While speed range is not limited to over synchronous operation in this case, the power converters have to be rated for the total power flow, similar to FIG. 4(a). Thus, the advantages of variable-speed generation are achieved, at the expense of significantly increased cost, size and weight due to the rating of the power electronic converter at greater than 100% of induction generator apparent power. This leads to very complex mechanical designs involving multiple induction generators and converters on the same turbine shaft.

Figure 4D:
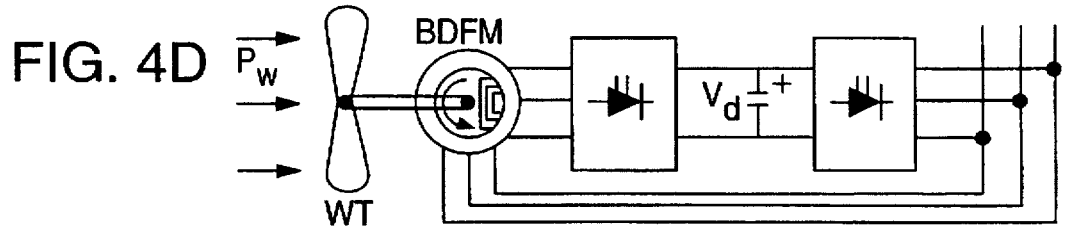

While also applicable to the doubly-fed system shown in FIG. 4(b), the invention utilizes a brushless doubly-fed machine as illustrated in FIG. 4(d). The invention uniquely combines the advantages of the cage rotor systems (low machine cost, robust brushless machine construction) with the benefits of the electronic Scherbius configuration (reduced power converter rating and cost) in a novel and unobvious manner. Additional benefits of the combination include greatly enhanced control flexibility due to an additional controller degree of freedom.

The brushless doubly-fed machine in FIG. 4(d) has two stator windings of different pole number to avoid direct transformer coupling. The power and control stator windings interact through the rotor which has a cage structure with a number of identical sections corresponding to the sum of the pole pairs of the stator windings. The machine exhibits synchronous behavior during which stator frequencies and shaft speed are related by the following equation:

$$f_c = f_r(p_p + p_c) \pm f_p \qquad (4)$$

where the subscript "p" refers to the power winding connected directly to the grid and the subscript "c" refers to the control winding connected to the power converter. The $p_p$ and $p_c$ are the pole pair numbers of the stator windings; $f_p$ is the utility grid frequency (60 Hz); $f_r$ is the shaft speed dictated by the variable-speed generation algorithm; and $f_c$ is the required converter output frequency.

Only a fraction of the generator power is processed electronically, resulting in reduced size and cost as well as improved power quality. The die-castable rotor cage ensures robust and inexpensive machine construction.

From FIGS. 2 and 3 it is clear that in order to obtain maximum power from the wind turbine it is necessary to keep the tip-speed-ratio $\lambda$ constant over a wide range of wind speeds. This is achieved by a maximum power point tracking (MPPT) system which tracks the optimum tip speed ratio for large variations of wind speeds. As wind speed varies, this involves appropriate control of generator shaft speed to ensure that the maximum turbine power is tracked, as illustrated in FIG. 3.

Figure 5:
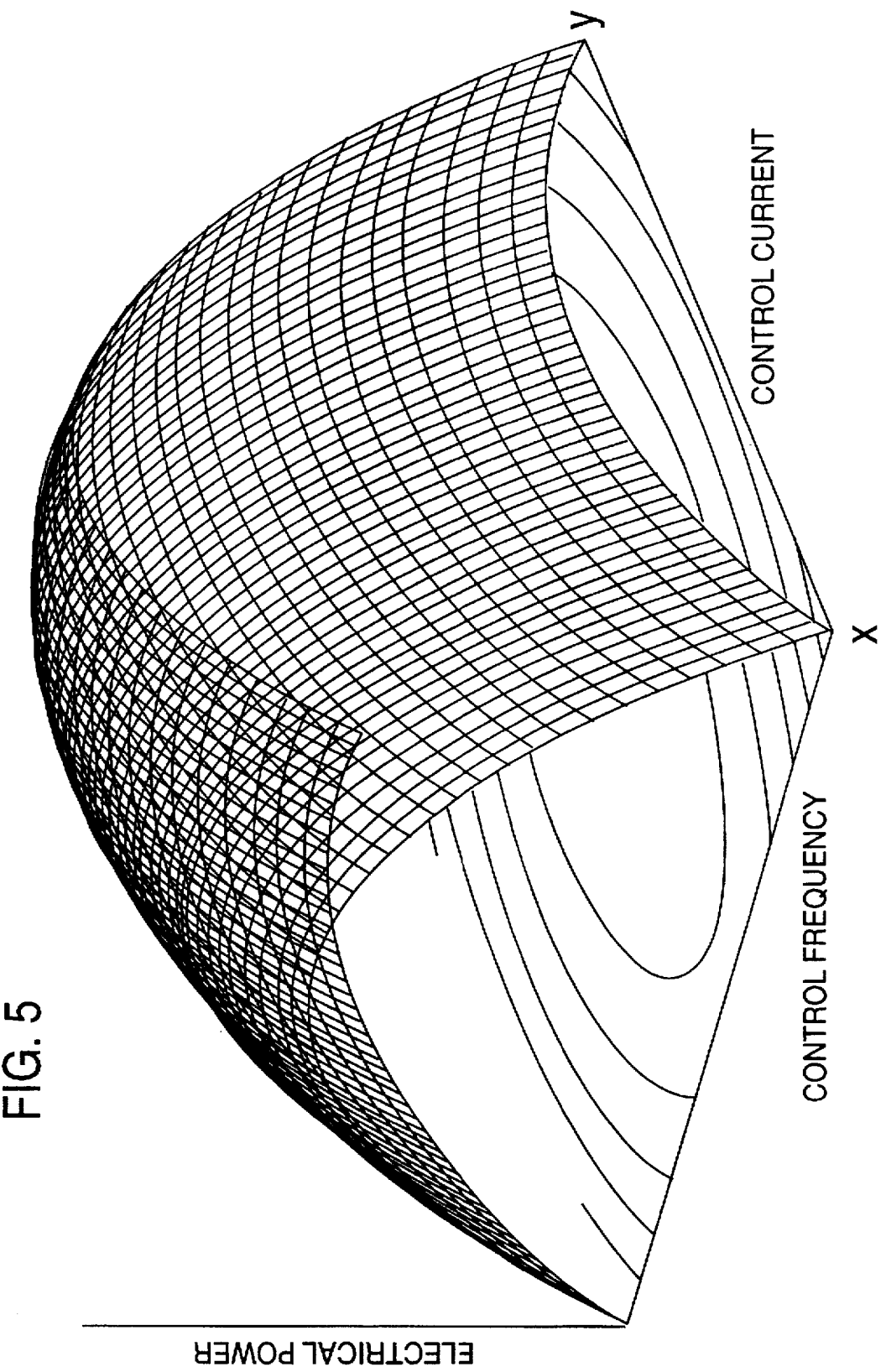
FIG. 5 is a three dimensional graph of electrical power as a function of control frequency and control current in a VSG system according to the invention.

In a doubly-fed machine, the mechanical MPPT varies the converter output frequency and thus the turbine shaft speed according to Eq. (4). At an established shaft speed $f_r$, stable operation is possible for a variety of control winding current levels, thus allowing for an additional degree of control freedom not present in singly-fed systems. The converter output current magnitude can be used to adjust active and reactive powers associated with the two stator winding systems. For a given mechanical input power, this can be used to control power flow in stator windings and power converter and thus maximize efficiency and output power. This has been shown initially with simulation studies and is verified experimentally as described below. Thus, the overall optimization problem for the mechanical (turbine) and electrical (generator) systems involves finding the maximum of power output as a function of (1) turbine shaft speed and (2) control current, as illustrated conceptually in FIG. 5. On the x axis of the graph of FIG. 5 is plotted control frequency $f_c$, which is the converter output frequency signal that is applied to the control stator winding to control the turbine shaft speed $f_r$. On the y axis is plotted a control current $I_c$, which is a current signal applied to the control stator winding to adjust the active and reactive powers associated with the BDFM and the power balance between both windings. On the z axis is plotted the real or active electrical power output by the system.

Figure 6:
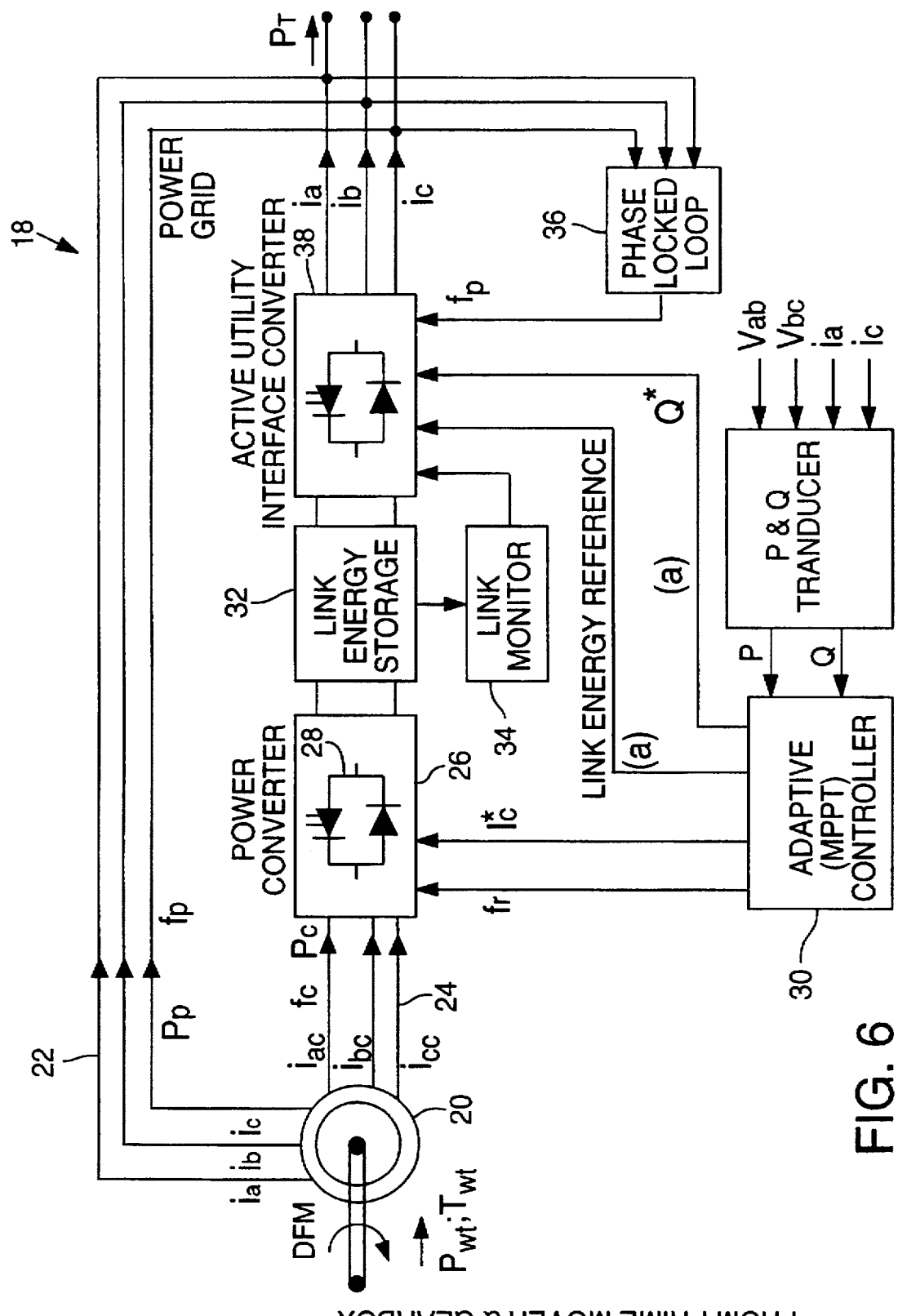
FIG. 6 is a block diagram of a VSG system for an electrical generator according to the invention.

To keep the controller of the system simple, mechanically robust and inexpensive, no mechanical inputs such as shaft torque should be required for the control algorithm. This has lead to the development of a VSG system 18 according to the invention which is illustrated in FIG. 6 and relies only on electrical feedback parameters of real power (for MPPT) and reactive power (for optional power factor control). Starting at the left of the figure, a VSG system according to the invention includes a doubly-fed machine (DFM) 20 whose shaft is connected to a wind turbine and gearbox (not shown). The DFM is an electromechanical device which converts mechanical energy to electrical energy and vice versa. The doubly-fed machine can be realized in different ways, such as in a:

(i) Brushless Doubly-Fed Machine (BDFM) with a modified cage rotor;

(ii) Wound Rotor Doubly-Fed Machine (WRDFM) with slip ring rotor connection; or (iii) Brushless Doubly-Fed Reluctance Machine (BDFRM) with windingless reluctance rotor.

The machine pursued in detail to illustrate the capabilities of the invention is option (i). It has two windings, the power winding with $p_p$ poles and the control winding with $p_c$ poles. The uncontrolled power winding 22 situated on the stator is directly connected to the grid. The control winding 24 is also situated on the stator and is connected to an ac/ac power electronic converter 28 which outputs variable voltage and variable frequency. (In option (ii) the converter would be connected to the rotor via slip rings, while option (iii) also provides for a stator connection). Torque production in the BDFM results from the interaction of the stator and rotor electromagnetic fields.

For a generator application, the wind turbine input power $P_{wt}$ is related to the turbine torque $T_{wt}$ by $$P_{wt} = T_{wt} f_r \qquad (5)$$

where $f_r$ is the DFM rotor and turbine mechanical speed. According to Equation (4) the rotor speed can be varied linearly by adjusting the frequency $f_c$ of the control winding through the power converter 28.

The description of FIG. 6 uses the term "output" for the interface of the converter to the machine and "input" for the interface between the converter and the utility grid. This is for identification purposes only, as the energy flow is bidirectional. For normal VSG operation in the super synchronous mode, energy will flow from the machine through the converter to the grid.

The power converter includes as its output stage a current controlled converter 28 with output current control. The converter 28 generates output currents $i_{ac}$, $i_{bc}$ and $i_{cc}$ in the DFM control winding $P_c$, which can be controlled to be sinusoidal with a fundamental frequency of $f_c$. As stated above, in the BDFM, converter and mechanical frequencies are related as shown in equation (4). Hence, $f_c$ can be determined by the converter with the information of the demanded mechanical speed $f_r$ of the DFM rotor and the turbine. The reference for the output current magnitude, $I_c$, is an input to the converter from an adaptive controller 30.

Connected to the input of the converter 28 is a link energy storage device 32. In conventional electronic ac/ac conversion, electrical energy of a certain form is stored in an intermediate dc or ac "link" which can be regarded as an energy reservoir, before it is finally converted to its desired form. This storage device 32 may be a capacitor bank in a voltage source converter or an inductor in a current source converter for topologies that use a dc-link. In an ac link a combination of passive devices (capacitors and inductors) is used. In yet another form of dc-link realization, a combination of passive and active devices (discrete electronic components like thyristors, IGBTs, MOSFETs, etc.) is used. It is also possible to convert energy from one form of ac to another form of ac, without the need for link energy storage. This is typically done in a direct converter topology.

The energy stored in the storage device 32 is monitored by a link monitor 34. This monitor includes voltage or current sensor(s) to measure the energy in the link for both dc and ac-link topologies. The monitoring of the link helps in regulating the link energy to a desired level. The desired link energy is determined by the voltage and current ratings of the sensitive active (power semiconductors) and passive devices in the power circuit. The information to increase or decrease energy in the link helps determine the net power flow into or out of the power converters 28 and 38 dynamically.

Also included within the VSG system 18 is a phase locked loop (PLL) 36. The PLL provides instantaneous frequency and phase information on the grid voltages to an active utility interface controller 38. Periodic oscillations arise if two asynchronous (of different frequencies of excitation) active sources are interfaced with each other. These oscillations render the circuit unstable. Thus the input stage of the interface converter 38 is controlled by the PLL in a manner such that its input voltage and current have a fundamental frequency similar to that of the grid on a dynamic basis. The PLL can be implemented by the following methods:

(a) actual grid voltage measurement; and (b) grid voltage zero-crossing detection.

The converter 38 is the active input stage of a bidirectional ac/ac converter with input current control. The converter 38 also includes a set of grid interface inductors connected between the electrical grid and the electronic circuit. The magnitudes of the input currents $i_a$, $i_b$ and $i_c$ are determined dynamically from the input/output power flow of the converter with information obtained from the link monitor 34. The input currents are controlled to be sinusoidal with a fundamental frequency of $f_p$ (information provided by the PLL), the grid frequency, and the frequency of excitation of the DFM power winding. Since both the magnitude and the phase of the input currents of the converter are actively controlled, it is possible to operate the converter with leading and lagging power factors at the input. This extra demand in the reactive power should be such that the kVA rating of the converter and the voltage and current ratings of the semiconductor devices and the other components are not exceeded and are controlled as to not interfere with the active power maximization described in this invention. As is known in the art, converter resources can also be utilized to control harmonic interference and regulate line voltage. However, as with reactive power control, these capabilities are subject to the availability of converter resources and are only implemented when the converter resources are not required for the power maximization control.

If the converter resources 28 and 38 are rated to only achieve the power maximization discussed in this invention, the actual converter utilization will depend on the level of resource energy as a function of wind speed (see FIG. 3). At one point, all the converter resources (allowable semiconductor device currents) may be fully utilized. However, at other points, possibly, not all converter resources are required for power maximization, i.e., the maximum semiconductor currents are not reached. Thus, the remaining allowable converter currents can be utilized for alternative control strategies. Here it is noted that the power maximization algorithm is entirely controlled by converter 28. Converter 38 is not responsible directly for this power optimization, but provides for the suitable energy transfer between converter 28 and the grid via the link 32. It is technically possible to control the DFM via the converter 28 to not maximize power, but to generate reactive power out of the stator windings 22. This makes it impossible to optimize real power output via converter current $I_c$ in 28; thus, it is better to use converter 38 for reactive power control and alternative control purposes. For reactive power control (to provide additional reactive power to the grid), the converter currents in 38 are controlled to be out of phase with respect to the utility grid voltage. This circulates reactive currents through converter 38 resulting in a higher current than in converter 28, which optimizes the generator real power without consideration to the reactive power. For harmonic filtering, the converter currents in 38 will be controlled to have, additionally, currents of higher frequency components, also resulting in a higher total current than in converter 28.

If converters 28 and 38 are rated for the maximization algorithm only, the capability to perform alternative controls (reactive power, voltage regulation, harmonic filtering) will be a function of wind speed and the associated available converter current resources in 38. However, it is possible to rate converter 38 different from converter 28 to allow for sufficient current capability for alternative controls at the utility interface without affecting the optimum power control of converter 28.

In summary, the generator 20 is delivering power from the stator winding 22 and control winding 24. The power converter 28, link energy storage 32 and the active utility interface converter, 38 control the torque and speed of the generator in order to maximize the power input from the mechanical resource. The power converter 28 is controlled by the adaptive maximum power point (MPPT) controller 30. The speed of the generator to track the maximum power point of the turbine is controlled by the control winding frequency reference $f_c$. The efficiency of the generator is controlled by the control winding current reference $I_c$.

The adaptive MPPT controller 30 has as input the measured active and reactive output power P and Q. These measurements are determined from the measured line voltages and currents using power transducers 40. The adaptive MPPT controller has as output also the required reactive power reference Q* transmitted to the active utility interface converter in order to control the reactive power on the output of the generator system. A link energy reference is also transmitted to the active utility interface converter to regulate the link energy storage, using the link monitor unit. The active utility interface converter is synchronized with the ac supply using a PLL 36.

The generator delivers $P_T$ power to the power utility at maximum input power and maximum generator efficiency.

The P and Q transducers are used to determine the power from measurements of voltage and current. The measured value of P is used to maximize the output power with the MPPT control algorithm. The reactive power Q is only measured to control the Active utility interface converter and does not affect the efficiency or maximum power point tracking algorithms.

The real and reactive powers are sensed by a regular power transducer, a standard commercial item. Electrical efficiency η is defined as electrical output real power divided by input real power, and is only determined by the real electrical power. Reactive power can only influence the efficiency by means of the magnitude of the current, but is not used in the calculation of efficiency η, where $\eta = P_{out}/P_{in}$ [%]

Additionally, the feature to isolate current harmonics from the grid can be implemented in the active utility interface converter 38. Algorithms to isolate harmonics are known and can be implemented in parallel with the other algorithms for active power and reactive power control. The apparent power rating of the active utility interface converter can be increased to perform these additional features. This principle is based on the fact that a load current is measured and decomposed into several components, i.e., active current component, reactive current component and a distortion current component. The reactive and distortion current components can now be inverted and used as references for the active utility interface converter. This will imply that the rating needs to be increased in converter 38 beyond that of converter 28 and beyond that required for real power optimization.

In a similar fashion, converter 38 can be controlled separately from and in addition to the real power maximization to provide for reactive power control, voltage regulation and flicker control. There are several ways of accomplishing these goals, and they are not related to the real power maximization algorithm.

Figure 7:
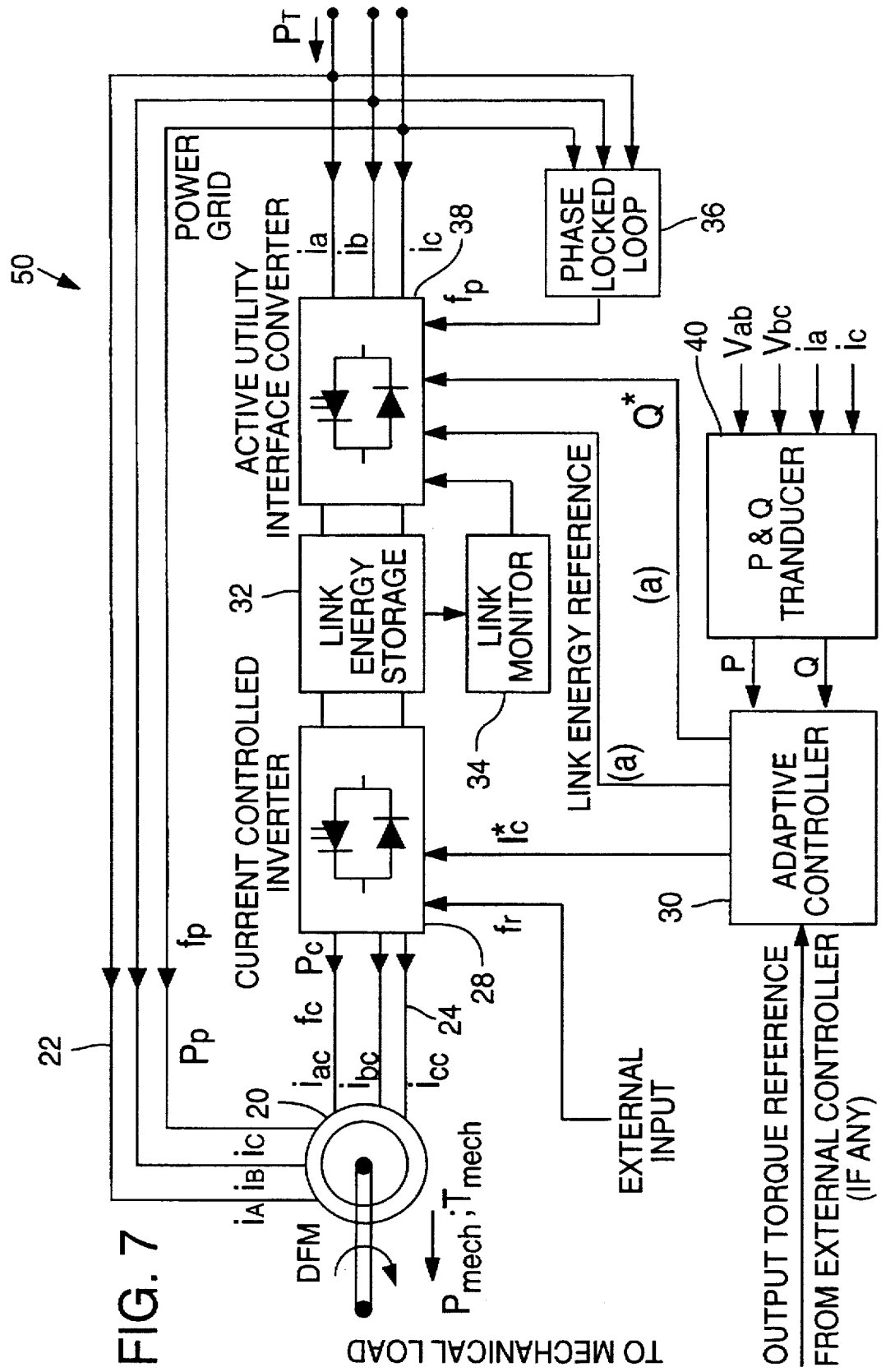
FIG. 7 is a block diagram of an adjustable speed drive (ASD) system for a motor according to the invention.

It is not necessary for the control to be implemented only in a generation system (power flow from left to right in FIG. 6), but it is equally applicable for drive systems (where power flows from right to left). FIG. 7 shows an alternative embodiment of the invention designed for a drive system such as a motor. Unlike in a variable speed generation system, in an adjustable speed drive application, the speed of operation is typically determined by the process or the application. Thus the speed of operation is an external input to the converter 28.

Torque control is achieved through a torque controller, which may or may not be incorporated into the adaptive controller 30. The current magnitude command is obtained from the adaptive controller, which minimizes the input power to the DFM while establishing a desired electromagnetic torque. The power-current-frequency graph as shown in FIG. 5 of the attached invention disclosure would be different and would have to accommodate the motoring mode of operation.

The BDFM motor is supplying mechanical power $P_{mech}$, to the mechanical load. The electrical power is supplied from the stator $P_p$ (22) and from the control winding $P_c$ (24). The current controlled converter 28, link energy storage 32 and the active utility interface converter 38 control the torque and speed of the motor. The speed is externally controlled using the control winding frequency $f_c$ reference. The current controlled converter 28 is controlled from the adaptive controller to maximize the motor efficiency using the control winding current $I_c$ reference.

The DFM motor drive draws $P_T$ power from the power utility at a maximum motor efficiency.

Figure 8:
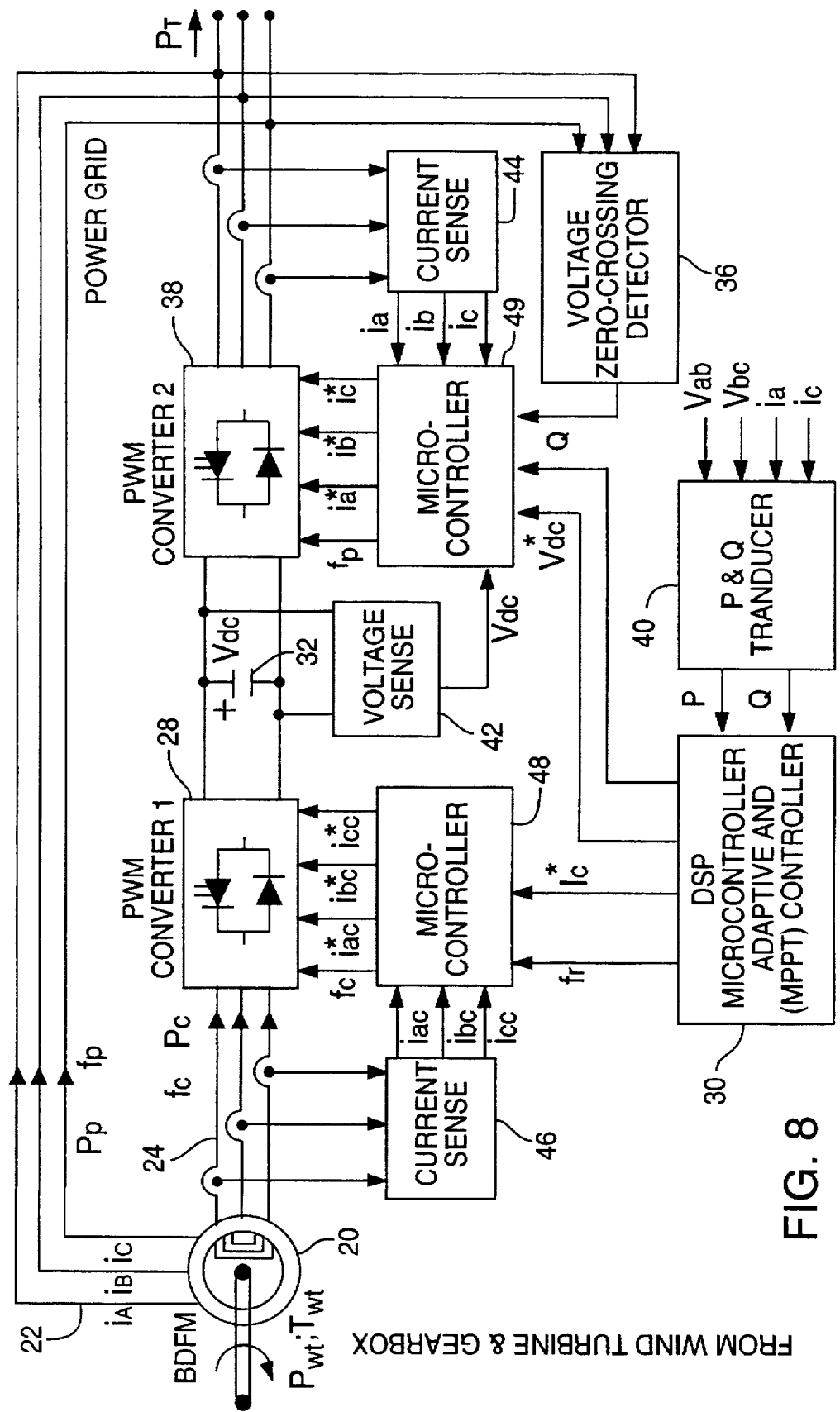
FIG. 8 is a block diagram of a particular embodiment of a brushless doubly-fed VSG system according to the invention.

FIG. 8 is a block diagram of a more particular embodiment of the invention. As shown, current control of converters 28 and 38 is achieved by dedicated, low cost microcontrollers while data acquisition, filtering and adaptive control is implemented in a digital signal processor.

The BDFM generator is delivering power from the stator winding 22 and control winding 24 to the power utility directly and through the converters 28 and 38. The power converter 28, link energy storage 32, and the converter 38, control the torque and speed of the generator in order to maximize the power input from the mechanical energy resource. The converter 28 is controlled via a current regulating microcontroller 30. The digital signal processor (DSP) microcontroller, implementing the adaptive maximum power point algorithm, generates the reference frequency and magnitude of current signals for the current regulating microcontroller 48 to regulate. The speed of the generator is controlled by the control winding frequency reference $f_c$, while the efficiency of the generator is controlled by the control winding current reference $I_c$. In order to regulate the control winding currents in the current regulating microcontroller 48, the control winding currents $i_{sc}$, $i_{bc}$, $i_{cc}$ are measured using a current sensor. As is known in the art, two of the three currents could also be sufficient for current regulation.

The DSP adaptive MPPT microcontroller has as input the measured active and reactive output power P and Q from the P and Q transducer. These measurements are determined from the measured line voltages and currents using power transducers. The adaptive MPPT controller has as output also the required reactive power reference Q* transmitted to the converter 38 in order to control the reactive power on the output at the generator system. A dc link voltage reference, $V_{dc}$ is also transmitted to the converter 38 to regulate the dc link voltage, using the voltage sense transducer 42. The inner loop of the converter 38 is regulating the current output of the converter 38, $i_a$, $i_b$, $i_c$. The interface converter 38 is synchronized with the ac supply using the voltage zero-crossing detector.

The generator delivers $P_T$ power to the power utility at maximum input power and maximum generator efficiency.

Figure 9:
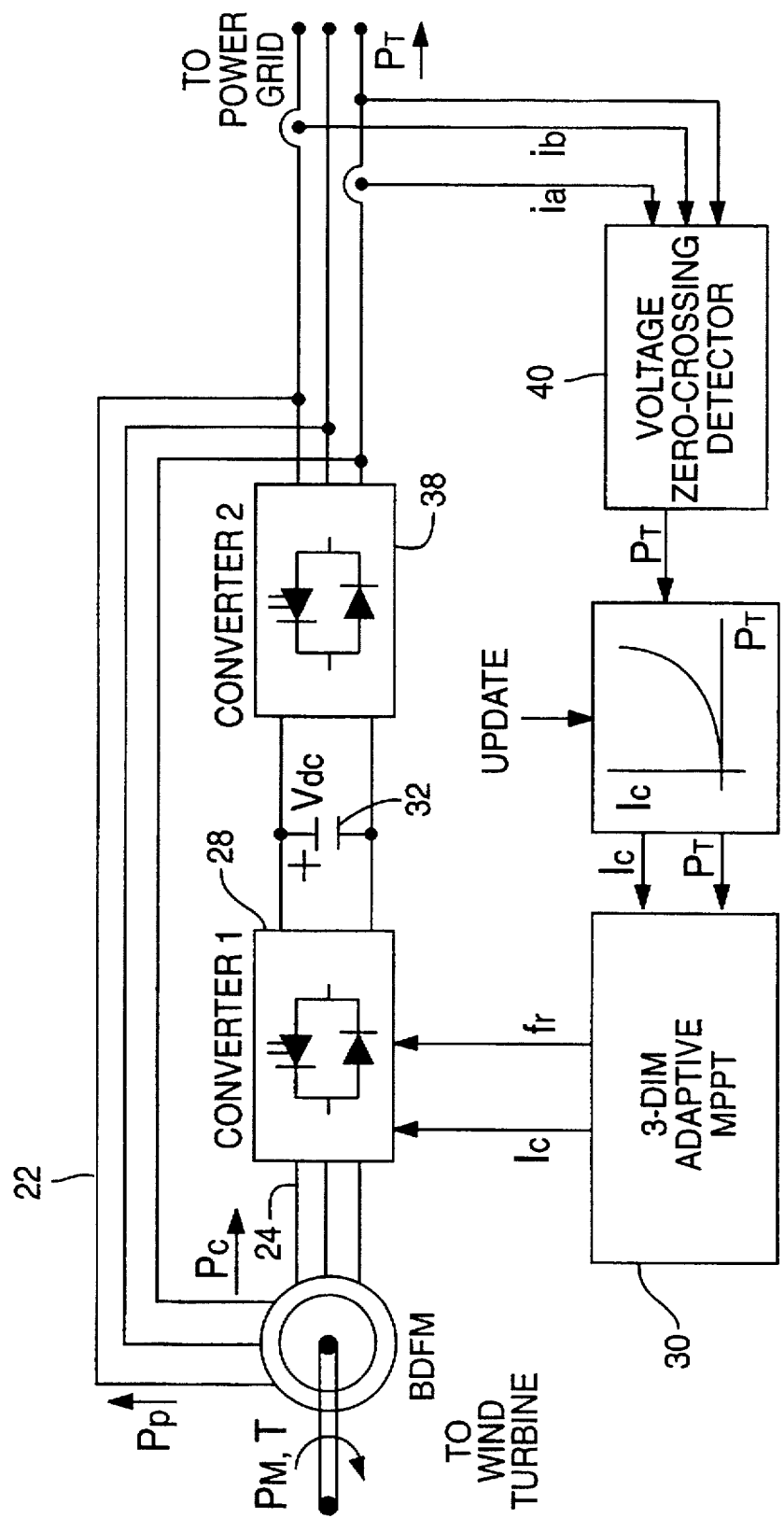
FIG. 9 is a block diagram of a control algorithm for a VSG system controller according to the invention.

In addition to the power and efficiency maximizing function associated with the turbine shaft speed, the adaptive controller 30 can also perform reactive power as well as harmonic compensation. FIG. 9 illustrates the control algorithm in block diagram form. Based on output power measurement, the adaptive controller 30 sets converter frequency and current magnitude. While currents for optimum efficiency and thus maximum output power could be calculated based on machine parameters, this should be avoided due to the variations of internal parameters such as rotor time constant. Since mechanical power is also not available, an adaptive approach is proposed in the digital signal processor to aid in the determination of the maximum power point as illustrated in FIGS. 5 and 9. The adaptive controller discussed here is based on artificial neural networks. This is, however, only one embodiment. Other possible embodiments are 1) the use of other forms of adaptive or intelligent control or 2) the use of mechanical feedbacks, or 3) the determination and use of system parameters.

To avoid lengthy search routines, basic system characteristics are provided as training data to the adaptive controller in this embodiment. These values for converter current magnitudes can be relatively crude measurements obtained during acceptance testing as explained below. The preprogrammed characteristics form the starting point for the MPPT search algorithm which is based on established techniques and ensures simplicity and avoidance of local maxima. Turbine speed is varied via the output frequency of the power converter 28 until the output power starts decreasing, i.e. until the optimum tip-speed-ratio is established. Perturbation of current magnitude around the value provided by the training data establishes maximum electrical efficiency in much the same manner.

In FIG. 9 the BDFM generator is connected to a wind turbine on the mechanical axis. A mechanical power from the wind turbine has a cube relationship to wind speed and a maximum operating point determined by the tip-speed-ratio. The BDFM generator is delivering power from the stator winding 22 and control winding 24 to the power utility directly and through the converters 28 and 38. The converter 28, link energy storage 32 and converter 38, control the torque and speed of the generator in order to maximize the power input from the wind turbine. The converter 28 is controlled by a three dimensional adaptive seeking control algorithm, implementing the adaptive maximum power point algorithm. The speed of the generator is controlled by the control winding frequency $f_c$, while the efficiency of the generator is controlled by the control winding current reference $I_c$. The control algorithm has an updating function, which updates the optimum current vs power characteristic during operation to account for changes due to environmental factors. Through an original setting and regular updates the output power of the generating system $P_T$ is plotted as a function of the control winding current $I_c$ of the BDFM. This update has an input measurement from the output power $P_T$ through the power transducer.

The generating system is interfaced to the power utility via the Converter 38 converting the dc power back into ac power. The generator system delivers $P_T$ power to the power utility at maximum input power from the wind turbine and at the maximum BDFM generator efficiency.

Once a maximum power point has been determined, the characteristic current-power function is updated via a simple two layer neural network. Thus, initial training data are updated on-line and take into account variations due to operating temperature, etc. As described, the search algorithm operates on a moving average value of output power representing relatively slow tracking dynamics (approximately one second). The MPPT will not track high frequency power disturbances due to wind gusts and tower shadow. These fast dynamics need to be accounted for in a separate, wider bandwidth outer control loop, not for efficiency optimization, but to ensure a reduction of system torque pulsation stresses.

Figure 10:
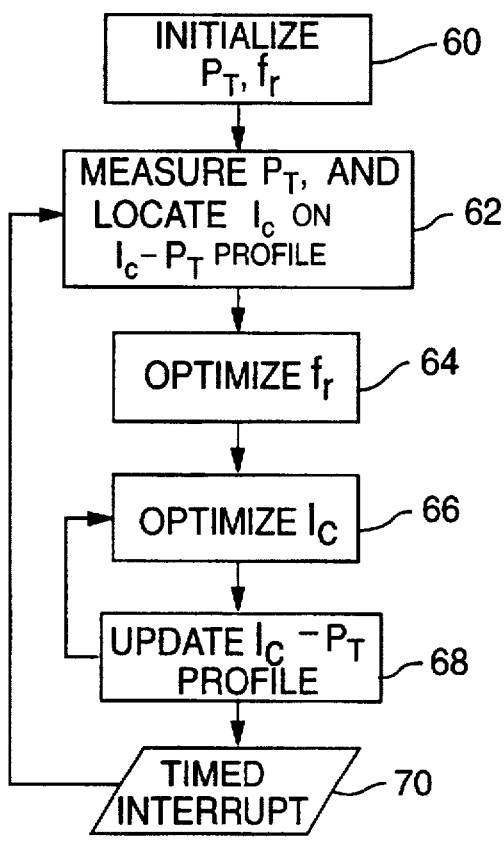
FIG. 10 is a flowchart of a generalized algorithm for output power maximization according to the invention.
Figure 11:
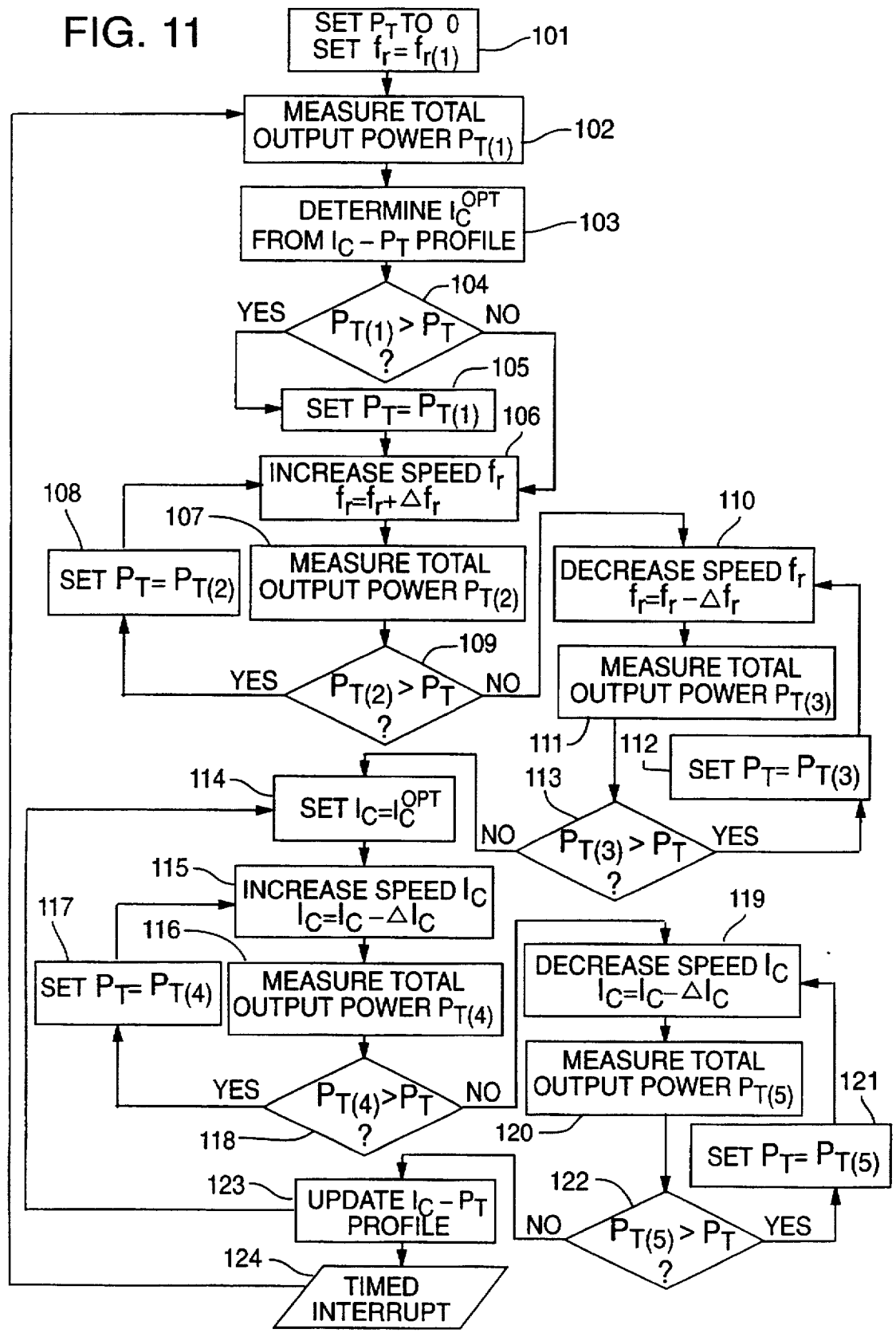
FIG. 11 is a more detailed version of the algorithm for output power maximization.

FIGS. 10 and 11 are flowcharts that illustrate the operation of system 18. The flowcharts are explained with reference to the wind power generation application. It should be noted that the algorithms can be adapted for other generation (diesel) or even motoring systems.

FIG. 10 shows a general representation of the output power maximization algorithm for a doubly-fed variable speed wind generation system. It should be emphasized that there could be a multitude of implementation methods for the individual blocks of the flowchart. While implementation could, possibly, vary considerably, the basic optimization algorithm would remain the same.

The algorithm begins by initializing, in 60, the variables $P_T$, which represents the total measured power of the generator system, and $f_r$, the mechanical or the shaft speed of the DFM-turbine system. Typically, upon system startup, these variables would be initialized non-optimally, and solely based upon the wind speed and the generated power thereof at the time of initialization. Measurement of the total output power $P_T$ helps in the determination of the optimal control winding current setting, in 62, from the previously stored $I_c$–$P_T$ profile. The $I_c$ and $P_T$ profile is developed during the DFM characterization as explained above and exemplified in FIG. 12. To ensure operation at the maximum power point of the wind turbine, the mechanical speed, $f_r$, is adaptively determined in 64 by controller 30 in FIG. 6. To further optimize the operation of the system, the control winding current, $I_c$, and $P_T$ are used to update the profile as shown in 66 and 68. The algorithm repeats with a new measured output power $P_T$ after a fixed delay, in 70 timed by an interrupt in the controller.

FIG. 11 details a simplified realization of the basic algorithm as shown in FIG. 10. As mentioned before, the mechanical speed, $f_r$, and the total output power $P_T$ are initialized, in 101 and 102 respectively, dependent upon the startup conditions. Based on the measured output power, $P_T$, the control winding of the doubly-fed machine (DFM) is excited with a current magnitude as determined from the existing $I_c$–$P_T$ profile as shown in 103 (see FIG. 9 as well). As the DFM control winding excitation is varied, the output power $P_T$ could possibly vary too. If the new measured value of output power $P_{T(1)}$ is greater than that of the initial value, then $P_{T(1)}$ is retained as is shown in 104 and 105. Determination of the initial optimum control winding current initiates the optimization algorithm of $f_r$ as detailed in 106-113. In 106, the initialized mechanical speed, $f_r$, is incremented by a predetermined quantity $\Delta f_r$. This change in the mechanical speed may vary the output power $P_T$ and thus the output power, $P_{T(2)}$, as measured in 107. The new output power, if determined, in 109, to be greater than the previous $P_T$, is saved, in 108, as the latest operating point for maximum output power. The process of incrementing the mechanical speed $f_r$ is repeated until the latest measured output power $P_{T(2)}$ is determined to be lower than that of the previous iteration. This leads to the next part of the algorithm where the mechanical speed is decreased by a predetermined quantity, $\Delta f_r$, as shown in 110-113. The basic operation of the algorithm in the speed decremental mode is similar to that in the speed incremental mode as detailed above.

Once the maximum power point is established by varying the mechanical speed, the system is further optimized by fine tuning the optimal control winding current setting, in 114-122. The process of varying the control winding current magnitude, $I_C$, is similar to the process for varying $f_r$. In 114-118, the control winding current is incremented until the maximum power point it attained, while in 119-122 the current is decremented to obtain the maximum power operating point. The new operating point, in the $I_C$-$P_T$ domain, obtained as detailed above, is updated in the profile, in 123. The update is required due to the continuously varying system parameters caused by changes in temperature, humidity, magnetic properties of the material of the machine, wear and tear, etc. As in FIG. 10, the algorithm repeats with a new measured output power $P_T$ after a fixed delay, in 124, timed by an interrupt in the controller.

As discussed above, the maximum power and efficiency tracking algorithm presented uses a perturbation algorithm, which incrementally changes excitation current frequency and magnitude to obtain maximum overall output power (thus maximizing energy extraction from the wind and minimizing electrical losses in the generator/converter system).

Figure 13:
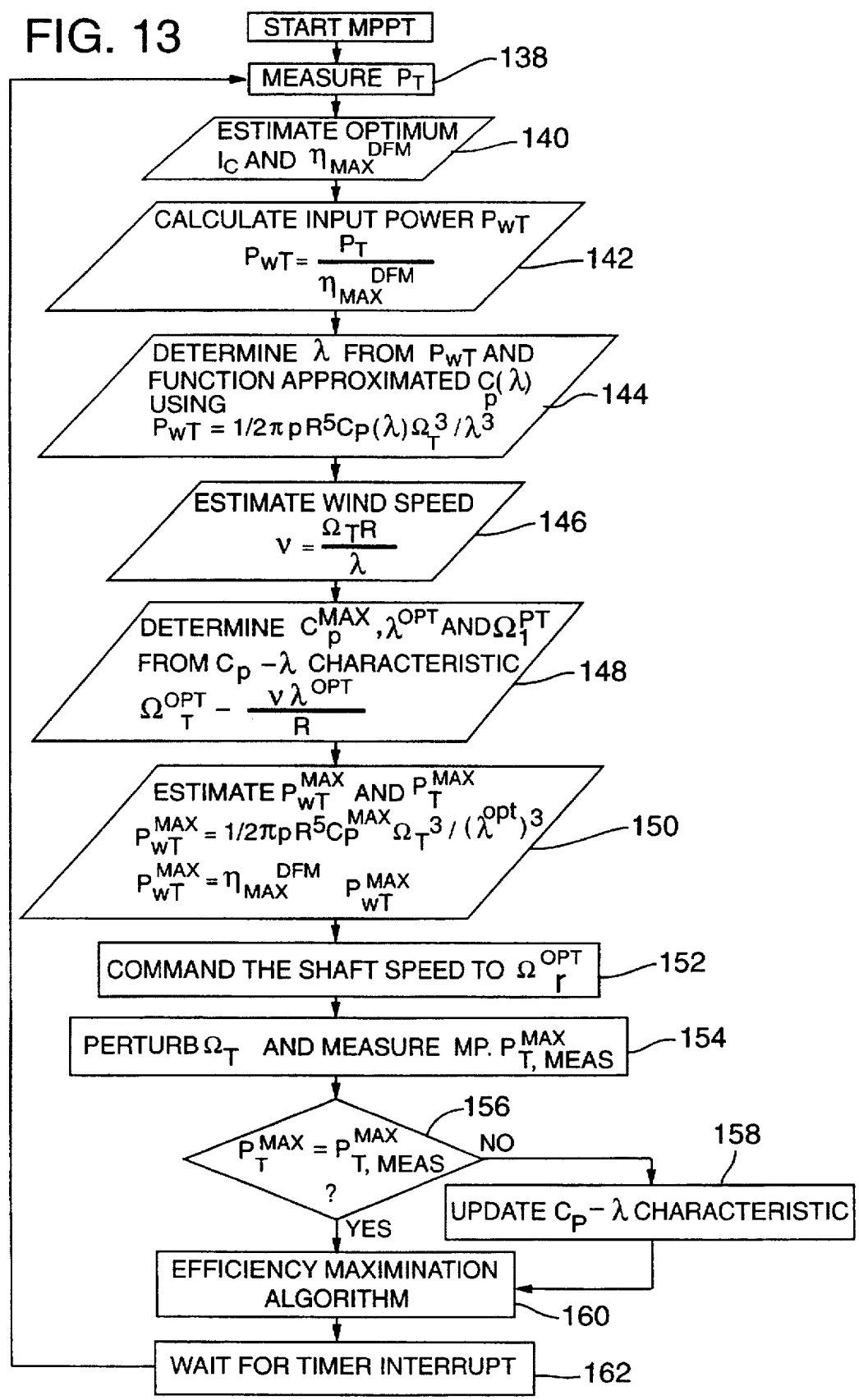
FIG. 13 is a flowchart of an alternative method for finding the maximum power point with respect to turbine speed.

FIG. 13 illustrates an alternative method for determining the maximum power point with respect to $f_r$. The algorithm discussed is a possible realization of block 64 in FIG. 10. In FIG. 11, the algorithm would replace blocks 104-113. (The algorithm 140-158 replaces 104-113 in FIG. 10.) This method enables a faster search for the maximum power point (M.P.) as compared to the varying shaft speed approach outlined above. Thus, this novel control strategy would potentially provide for a more effective generation system.

The main control blocks of this novel algorithm are as shown in FIG. 9. The total output power, $P_T$, is the only sensed quantity (electrical or mechanical) for the MPPT control loop. The $I_C$ vs $P_T$ block of FIG. 9 is detailed in FIG. 12, which shows an example curve determined from a laboratory prototype. The optimum control winding current $I_C$ with respect to the total output power $P_T$ as characterized in FIG. 12 is obtained from maximum efficiency measurements as shown in FIG. 14. Thus it is conceivable that information regarding the maximum efficiency of the DFM with respect to total output power $P_T$ can also be determined easily from FIG. 14. Moreover, this stored information should be updated similar to that of the $I_C$-$P_T$ curve.

Following is the alternative method for determining the optimal shaft speed as shown in the flowchart of FIG. 13:

1. Estimate in 140 the maximum DFM efficiency $\eta_{max}$ at a particular output power from the stored and updated information.

2. Calculate in 142 input power $P_{wt}$ to the DFM from estimated maximum efficiency $\eta_{max}$ and measured output power $P_T$.

3. Determine in 144 $\lambda$ from $P_{wt}$ and the following equation:

$$P_{wt} = \frac{1}{2} \pi \rho C_P(\lambda) R^5 \frac{\Omega_T^3}{\lambda^3} \quad (6)$$

Where $C_p(\lambda)$ is a functional representation of the $C_p$ vs. $\lambda$ characteristic of the turbine as shown in FIG. 2. $\rho$ is the density of air, R is the turbine radius, and $\Omega_T$ is the rotor speed which can be determined from equation (4).

4. From the shaft speed and $\lambda$ as determined in point 3. above, the wind speed can be determined in 146 using equation (1).

5. Determine in 148 $C_p^{max} \lambda^{opt}$ from the $C_p$-$\lambda$ curve in FIG. 2. Calculate $\Omega_T^{opt}$ from $$\Omega_T^{opt} = \frac{v \lambda^{opt}}{R} \quad (7)$$

6. Estimate in 150 $P_{wt}^{max}$ and $P_T^{max}$ for the wind speed v using the following equations:

$$P_{wt}^{max} = \frac{1}{2} \pi \rho C_p^{max} R^5 \frac{\Omega_T^3}{(\lambda^{opt})^3} \quad (8)$$

7. Command in 152 the system to the desired optimum shaft $$P_T^{max} = \eta_{max}^{DFM} P_{wt}^{max} \quad (9)$$

speed $\Omega_T^{opt}$ determined from (7) above and measure the total output power $P_T$.

8. Perturb in 154 the shaft speed within a small speed range and measure the total output power $P_T$ repeatedly to actually determine and confirm the M.P. Call it $P_{tmess}^{max}$.

9. Compare in 156 the estimated $P_T^{max}$ to the measured $P_{tmess}^{max}$.

10. If they do not compare within a predetermined limit or threshold, update in 158 the optimum power coefficient, used in step 4, in the $C_p$-$\lambda$ curve. The power coefficient of the turbine may have been modified due to the change in parameters of the turbine over time caused by wear and tear. The new optimum $C_p$ can be determined by using $P_{wt}^{max}$ in 146 (equation (6)) and assuming the wind speed to have remained constant.

11. Go in 160 to the efficiency maximization algorithm (114-123 in FIG. 11) and continue.

This algorithm is not entirely based on a perturbation approach as the one previously described (blocks 104 to 113 in FIG. 11), but uses perturbation for fine adjustments.

The algorithms discussed above concentrate on the wind power application of the power and efficiency maximizing control system for brushless doubly-fed machines. The method is also applicable to other generation resources, other doubly-fed systems (wound rotor induction machine, doubly-fed reluctance machine) as well as motor drive systems. In the latter case, input power will be minimized for a certain load to achieve efficiency maximization by optimal loss allocation between motor subsystems (stator windings, rotor) and converter.

The above flowcharts discuss the maximization of active or real power from resource to electrical utility grid. As discussed above, this does not leave a degree of freedom to independently generate reactive power. Rather, the machine will draw reactive power required for magnetization at the particular operating point. The reactive power feedback, Q, and reactive power set point, Q*, shown in the figures only interact with the converter 38 (FIGS. 6 and 7) at the grid and are separate from and in addition to the real power maximization. The real power control is discussed in detail in the flowcharts and sets the in-phase current component of converter 38. The reactive power controller only involves converter 38 and provides for an additional out of phase current component of converter 38.

Output power in the efficiency maximizing scheme (in all the flowcharts) is defined as the real power.

As discussed, in converter 28 the output current can be used to either change real power associated with the machine or reactive power, but not both. If it is desirable to maintain a certain reactive power without using converter 38, a compromise can be made between real and reactive powers via current $I_c$. Then for example, we define a performance factor such as the product of efficiency*power factor to be optimized. This still leaves $f_c$ to optimize power transmission from resource to turbine, but $I_c$ now is not used for optimization of efficiency, but of this performance index.

There are various forms of adaptive controllers that can be implemented to achieve output power maximization for generator operation or input power minimization for motor operation which use any (or combination) of the following:

a) recursive algorithms;
b) a system identification approach;
c) on-line parameter estimation;
d) use of mechanical feedback;
e) multi-dimensional maximization or minimization algorithm;
f) fuzzy-logic;
g) artificial neural network; and
h) expert system or any other form of intelligent control.

Using electrical duality it is easily seen that a similar control strategy can be implemented using terminal voltage control instead of the current control as shown in the block diagrams. An optimum control winding voltage $V_c$ (average of the three phase RMS voltages) versus the total power $P_T$ profile would then be required for the controller.

To summarize, the invention includes a DFM system in the form of a generator that is connected to a utility grid. The generator is characterized by voltage and current at the interface to grid. One may now control voltage and currents to achieve various performance requirements. This includes:

(i) At a given resource energy level (constant input power) the converter 28 is controlled such as to maximize the active or real (in-phase) component of the total current at the grid interface. This is the discussed output power maximization using both converter frequency and current.

(ii) Current in 28 is controlled to minimize the reactive (out of phase) current at the grid interface. This achieves an optimum "power factor" of the system. (Converter frequency is still used to quasi-optimize output power, but current is now used to optimize reactive power.)

(iii) Items (i) and (ii) are generally not attainable at the same time, thus a choice has to be made in which parameter to optimize. It is also possible to create a somewhat artificial performance index made up out of a combination of (i) and (ii). Often a product of efficiency times power factor is used as a goodness factor. Our system can sense voltages and currents, determine active power and reactive power (being responsible for power factor) and maximize for example the ratio of real power to reactive power.

(iv) Use current control of 28 to maximize the real power output to the utility grid and use reactive current control of converter 38 to provide for reactive power control at the grid and to compensate for reactive power requirements of stator winding 22. This may require a higher rating for converter 38 than 28 but allows for concurrent reactive and real power control.

(v) Due to the switching converter of the generator and/or other systems connected to the grid, the current waveform may be distorted with harmonics. It is possible via controlling the converter 38 to cancel or isolate these harmonics, achieving optimum harmonic performance. This feature requires additionally the injection of currents of higher frequencies than the control frequency used in (i, ii, iii).

(vi) At times, the grid voltage can be disturbed at the point of common coupling due to factors associated with the grid, such as loading, etc. This disturbance can be in the form of a lower fundamental (referred to as voltage dip or sag) or a variation in the rms value (called flicker). Again, this can be ameliorated via appropriate control of the converter 38 and (for high frequency signals) can be concurrent with items (i, ii, iii).

It should be noted that all controllers and control methods are limited to the extent that the converter is designed to produce the appropriate range of frequencies and current magnitudes.

Sensors that may be used for these items are:

(i) Electrical output power or fundamental voltages and currents to calculate electrical output power.

(ii) Reactive power or fundamental voltages and currents to calculate reactive power.

(iii) Real and reactive power or fundamental voltages and currents to calculate electrical output power and reactive power.

(iv) A current sensor having high bandwidth to show the indicated harmonics signal.

(v) A voltage sensor having high bandwidth to generate voltage flicker indication signal (if only magnitude regulation is desired, a conventional transducer as in (i) through (iii) after the "OR" is sufficient).

Since the BDFM has a fixed relationship between the control winding frequency $f_c$, and the mechanical speed (similar to a synchronous machine) there is a direct relationship between the machine speed and the control winding frequency $f_c$. This is represented in Eq. (4). The torque in the generator application is not controlled per se. For a given wind speed, control of the frequency establishes the maximum power point for the turbine, i.e., the maximum torque*speed product. Torque is provided by the resource in a generator and the generator needs to respond to this in an optimum manner. Once control of $f_c$, has established the optimum conversion from resource energy into mechanical energy, the control winding current $I_c$, is used to optimally allocate the electrical energy produced in the generator between electrical components to minimize losses. There is no need to sense the turbine speed since there is a direct relationship between the speed and the control winding frequency $f_c$, (synchronous nature of machine, eq., (4)).

Once $f_c$ has established the optimum turbine operating point, the control winding current $I_c$ is used to optimally transfer the mechanical to electrical energy. Here it must be noted that the doubly-fed machine (like any ac machine) has real (active) as well as reactive power associated with it. In the BDFM, both stator windings (22 and 24) produce real power and require reactive power (or produce the latter) as a function of excitation (voltage and current applied to the windings). The real powers delivered by the power winding and the control winding (through the converters) to the grid is optimized by the invention. The control winding current magnitude is used to change the real and reactive power allocation between windings. In the real power maximization discussed in the invention, reactive power is not directly controlled via the machine, i.e. the reactive power associated with the windings will be such that the machine is magnetized properly. We can only control optimally one or the other (real or reactive) power in the machine via the converter current into 24. Thus, we optimize the real power generation at the expense of possibly additional reactive power drawn by winding 22 from the grid. We can still optimize the reactive power performance at the grid interface not via the machine, but via the utility interface converter 38 itself.

To illustrate the capabilities of the brushless doubly-fed wind generation system discussed, the following case study compares a BDFM generator with a more conventional VSG system based on a cage rotor induction machine and PWM converter utility interface. The study is based on a wind turbine rated at 100 kW, with characteristics as shown earlier in FIGS. 2 and 3. To illustrate performance in a wind application, the study compares both generation systems for use at a typical wind site on the Oregon coast.

The induction machine characteristics used are typical for the rating considered and are based on published and available manufacturers data. Table I summarizes the performance parameters as assumed in this study for the induction machine VSG system.

TABLE I

| INDUCTION MACHINE VSG SYSTEM | |
|---|---|
| Voltage Rating | 480 V |
| Power Rating | 100 kW |
| Enclosure | Drip proof, High Eff. |
| NEMA Frame | 405 |
| Machine Efficiency (100% Load) | 94.5% |
| Machine Power Factor (100% Load) | 89% |
| Converter Rating | 120 kVA |
| Nominal Converter Efficiency | 97% |

The brushless doubly-fed generator is based on six and two-pole stator windings and a die-cast "four-pole" rotor geometry in an induction machine frame. It should be noted that this is only an example and that other pole combinations are also possible. Machine design and modeling follow established procedures as discussed previously. While copper loss in the BDFM is calculated directly, core and stray load losses are assumed at 200% of a single winding induction machine to account for higher rotor frequencies and increased leakage due to the two winding stator configuration. Table II summarizes some important BDFM VSG parameters. Speed range and power factor considerations lead to the selection of a 75 kVA power converter, which represents 62.5% of the equivalent induction machine converter rating. In both cases the same gearbox is assumed. The control approach as discussed here does not require the use of a gearbox and can also be applied to direct drive systems without a gearbox.

TABLE II

| BDFM VSG SYSTEM | |
|---|---|
| Voltage Rating | 480 V |
| Power Rating | 100 kW |
| Design Efficiency (100% Load) | 94% |
| Converter Rating | 75 kVA |
| Nominal Converter Efficiency | 97% |

Figure 15:
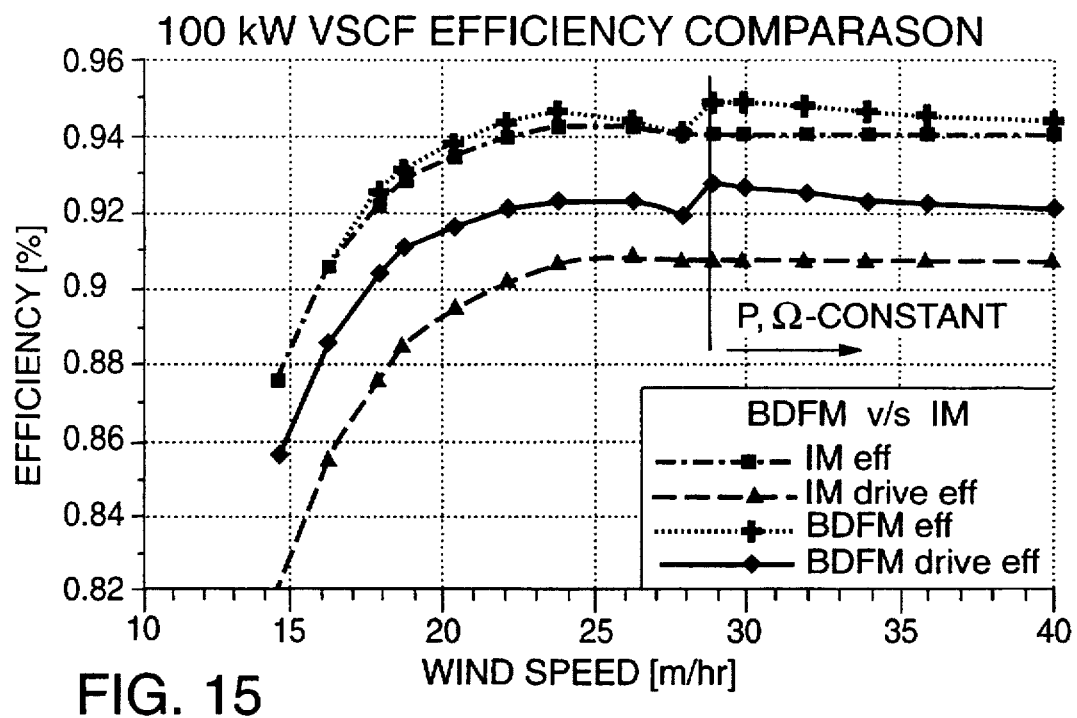
FIG. 15 is a graph of efficiency comparisons.

FIG. 15 compares steady state electrical efficiencies for the two machines and VSG systems when operating with a wind turbine as described by the characteristics in FIGS. 2 and 3. The curves are based on shaft to grid performance and do not include mechanical losses due to gearbox or other extraneous equipment. Induction machine control is based on established air gap flux control, while BDFM control relies on the optimized algorithm discussed above. Both systems operate over the same speed range, approximately 3:1. As illustrated, the BDFM shows comparable efficiencies to the induction machine. However, when the full VSG systems are considered, converter efficiency becomes significant and the reduced rating of the BDFM power electronics enhances system efficiency significantly. It should be noted that in FIGS. 2 and 3, wind speeds in excess of 28 m/hr correspond to the constant power mode of operation with the resulting sharp drop off in shaft speed of approximately 20%. For wind speeds of around 24 to 28 m/hr, the BDFM system as designed for this example was found to be voltage limited due to the high converter frequencies required (Eq. 4) and not operating truly in the optimum efficiency mode. This can be adjusted by proper design of the doubly-fed machine to better match turbine speed range and grid voltage. The drop in shaft speed in the constant power regime allows improved current control in the BDFM with the resulting increase in efficiency as illustrated.

Figure 16:
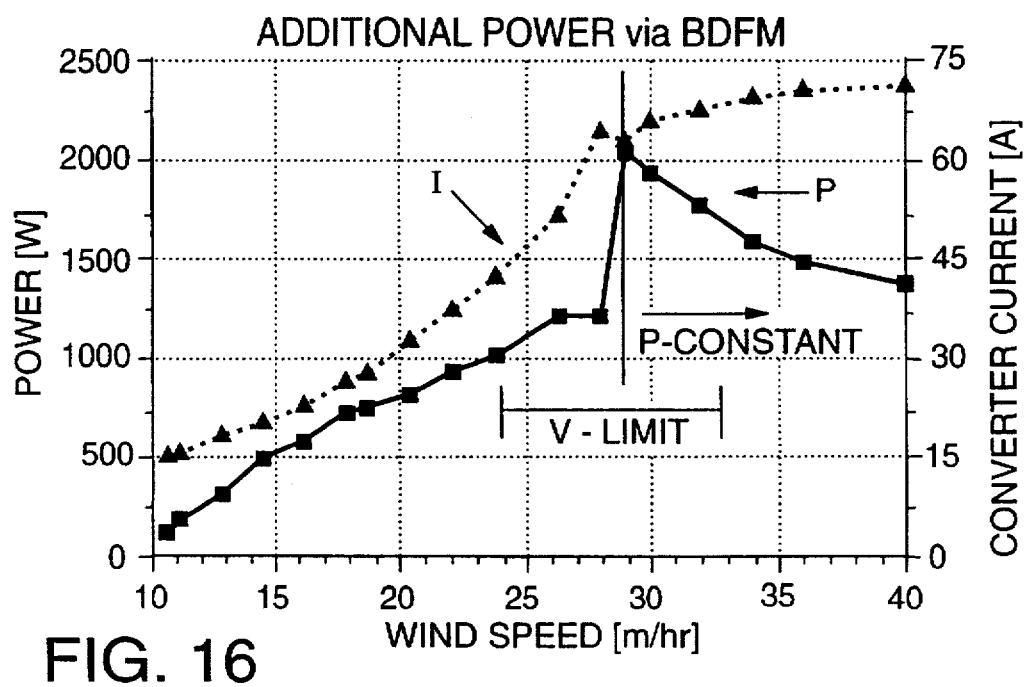
FIG. 16 is a diagram of BDFM power gain and converter current.

FIG. 16 illustrates the BDFM control winding current and also details the additional power generated by the BDFM VSG system when compared with the induction machine system. As shown, converter current increases with speed in the variable speed region and becomes almost constant during constant power operation.

To compare the economic gains which can be realized by using the proposed BDFM generator, the electric power gains were evaluated for a wind site on the Oregon Coast with an annual wind distribution as shown in FIG. 17. Integration of power outputs over the useful wind speeds for the designed systems (10 to 40 m/hr) yields the economic result summarized in Table III.

TABLE III

| BDFM BENEFITS FOR 100 kW WIND GENERATOR | |
|---|---|
| Increased Energy Capture per Year | 5077 kWh |
| Price per kWh | $0.055 |
| Net Capital Gain per Year | $279.25 |

It should be emphasized that the economic benefits shown are based solely on operating characteristics over a one year time frame. Initial cost is also very important in renewable energy system design. Based on comparable machine and control hardware cost, the lower converter rating of the BDFM system will translate into additional cost incentives, which are not reflected in Table III.

An existing laboratory prototype of relatively low power rating (7 kW) can be used to illustrate steady state doubly-fed machine performance and supports the control algorithm presented. The laboratory generation system is driven by a dc drive programmed with a cubic power-speed relationship, representing a wind turbine characteristic at optimum tip-speed-ratio. FIG. 14 illustrates the relationship between electromagnetic energy conversion efficiency and converter current magnitude for a range of mechanical input power values. It is evident that a unique value of current will ensure optimum efficiency and thus maximum electric output power. It should be noted that the efficiency values given are for a non-optimized system based on a BDFM rewound and converted from an induction machine. Thus, results should only be taken as qualitative representations of system capabilities.

The peaks of the curves in FIG. 14 represent the desired operating values for a wind power control system. However, since in this embodiment, mechanical power is not available in the adaptive controller, the raw data in FIG. 14 can not be used as training data for the neural network algorithm. Rather, training data is established by plotting the optimum control winding current values as a function of electrical output power, which is available to the controller as a feedback quantity (see FIGS. 6-9). The resulting curve is illustrated in FIG. 12 for the experimental system. The maximum efficiency tracking algorithm initially uses this data to establish a current operating point close to the peak efficiency (see FIG. 5). After an on-line efficiency maximum has been determined, the graph is updated by the neural network.

The laboratory system can also be used to illustrate the enhanced energy capture due to the optimized controller. FIG. 18 shows mechanical power as a function of speed for the laboratory generator. Note that the speed range had to be kept low due to a combination of converter voltage limits and mechanical test stand considerations. The electrical power curves shown compare the BDFM operating with the optimum control algorithm with a conventional system based on constant current ($I_c$) or equivalent V/Hz control. It is evident that a significant increase in power output can be achieved, which correlates with the case study shown in FIG. 16.

In view of the many possible embodiments to which the principles of our invention may be applied, it should be recognized that the illustrated embodiment is only a preferred example of the invention and should not be taken as a limitation on the scope of the invention. Rather, the scope of the invention is defined by the following claims. We therefore claim as our invention all that comes within the scope and spirit of these claims.

We claim:

1. Apparatus for maximizing output power generated by a doubly-fed machine generator having a rotor, a stator and multiple windings including at least one control winding, the doubly-fed machine being responsive to changes in amplitude and frequency of a control winding excitation signal from a power converter coupled to said control winding, comprising:

a sensor for sensing the output power of the doubly-fed machine; and a controller for controlling the power converter and responsive to the sensor, the controller adapted to maximize the output power by:

signaling the converter to adjust the frequency of its output signal so as to adjust the frequency of the control winding signal and thereby the rotor speed to maximize the output power; and signaling the converter to adjust the amplitude of its output signal so as to adjust the amplitude of the control winding signal to maximize said output power, whereby the maximum output power of the machine is determined as a function of both the frequency and amplitude of the output signal of the power converter.

2. The apparatus of claim 1 wherein the doubly-fed machine generator is operatively connected to a turbine driven by a variable energy resource.

3. The apparatus of claim 1 including an electrical connection to an electrical grid to supply the output power of the machine to the grid.

4. The apparatus of claim 3 including means for isolating current harmonics from the electrical grid.

5. The apparatus of claim 3 including means for regulating voltage at a point of connection to the grid.

6. The apparatus of claim 3 including means for maximizing the power factor at a grid interface.

7. The apparatus of claim 3 including means for filtering current harmonics at a grid interface.

8. A method for maximizing output power generated by a doubly-fed machine generator having a rotor, a stator and multiple windings including at least one control winding, the doubly-fed machine being responsive to changes in amplitude and frequency of a control winding excitation signal from a power converter coupled to said control winding, comprising:

sensing the output power of the doubly-fed machine; and controlling the power converter in response to the sensed output power by:

adjusting the converter output signal frequency to adjust the frequency of the control winding signal and thereby the rotor speed to maximize the output power; and adjusting the converter output signal amplitude to adjust the amplitude of the control winding signal to maximize the output power, whereby the maximum output power of the machine is determined as a function of both the frequency and amplitude of the output signal of the power converter.

9. Apparatus for minimizing input power consumed by a doubly-fed machine motor having a rotor, a stator and multiple windings including at least one control winding, the doubly-fed machine being responsive to changes in amplitude and frequency of a control winding excitation signal from a power converter coupled to said control winding, comprising:

a sensor for sensing the input power consumed by the doubly-fed machine; and a controller for controlling the power converter and responsive to the sensor, the controller adapted to minimize the input power by signaling the converter to adjust the amplitude of its output signal so as to adjust the amplitude of the control winding signal to minimize said input power, whereby the minimum input power consumed by the machine is determined as a function of the amplitude of the output signal of the power converter at any given frequency.

10. The apparatus of claim 9 including an electrical connection to an electrical grid to supply the power from the grid to the machine.

11. The apparatus of claim 10 including means for isolating current harmonics from the electrical grid.

12. The apparatus of claim 10 including means for regulating voltage at a point of connection to the grid.

13. The apparatus of claim 10 including means for maximizing the power factor at a grid interface.

14. The apparatus of claim 10 including means for filtering current harmonics at a grid interface.

15. A method for minimizing input power consumed by a doubly-fed machine motor having a rotor, a stator and multiple windings including at least one control winding, the doubly-fed machine being responsive to changes in amplitude and frequency of a control winding excitation signal from a power converter coupled to said control winding, comprising:

sensing the input power consumed by the doubly-fed machine; and controlling the power converter in response to the sensed output power by adjusting the converter output signal so as to adjust the amplitude of the control winding signal to minimize said input power, whereby the minimum input power consumed by the machine is determined as a function of the amplitude of output signal of the power converter at any given frequency.

16. Apparatus for controlling the output power generated by a doubly-fed machine, comprising:

a sensor for sensing the output power of the doubly-fed machine;

a power converter coupled to a control winding of the doubly-fed machine for controlling a generator through an excitation signal applied to the control winding;

a controller responsive to the sensor for controlling the power converter by:

signaling the converter through a control winding frequency reference signal to adjust the frequency of the control winding signal and thereby to control generator speed; and signaling the converter through a control winding current amplitude reference signal to adjust the current amplitude of the control winding signal and thereby to control efficiency of the generator.

17. Method for controlling the output power generated by a doubly-fed machine system, the system including a power converter and a generator, the method comprising the following steps:

sensing the output power of the doubly-fed machine;

controlling the power converter in response to the sensed output power;

signaling the converter through a control winding frequency reference signal to adjust the frequency of the control winding signal and thereby to control generator speed; and signaling the converter through a control winding current amplitude reference signal to adjust the current amplitude of the control winding signal and thereby to control efficiency of the generator.

* * * * *